Dec. 24, 1935.  A. L. KRONQUEST  2,025,061
MACHINE FOR CLOSING CANS
Filed Nov. 15, 1933  16 Sheets-Sheet 1

Fig. 3.

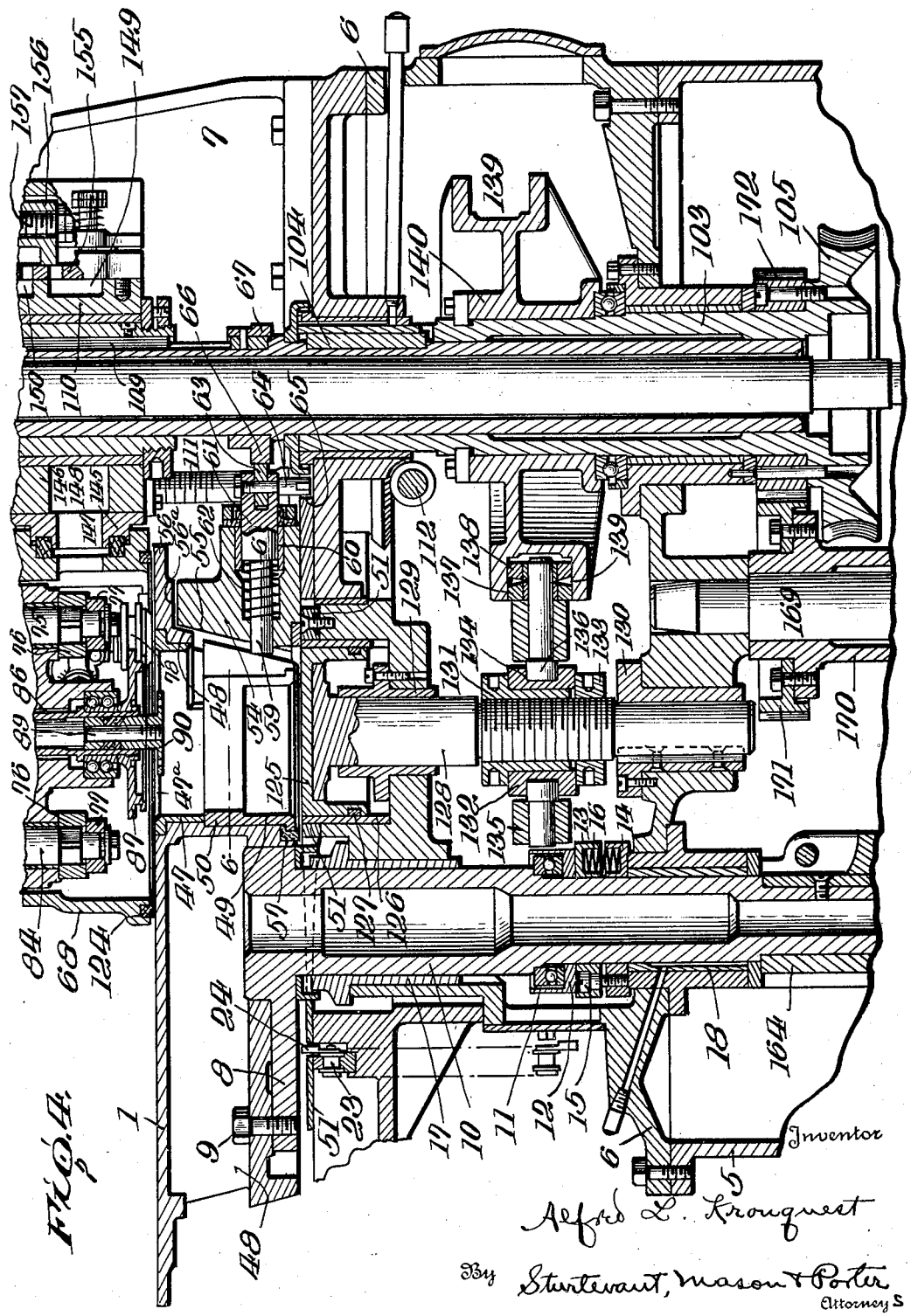

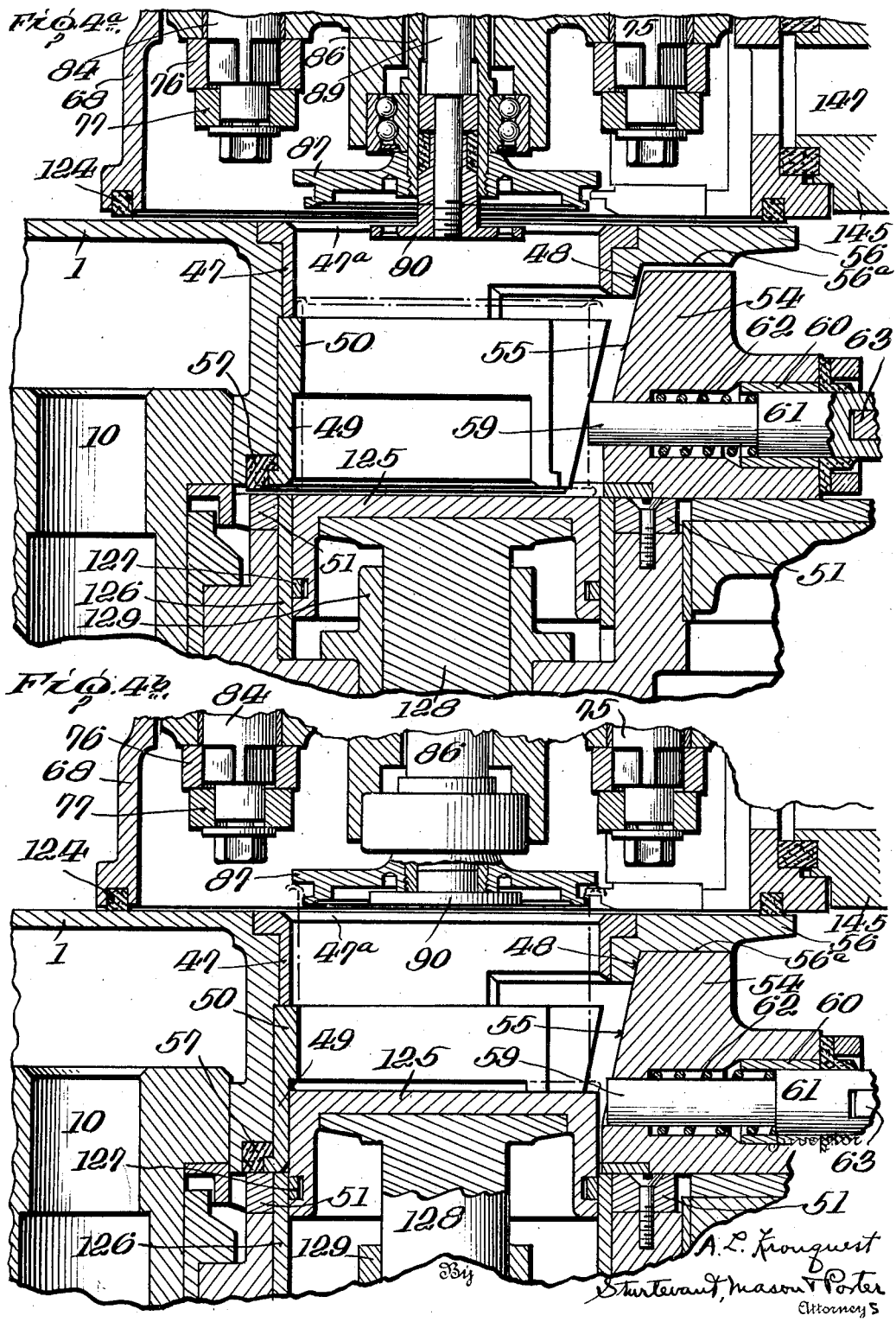

Dec. 24, 1935.  A. L. KRONQUEST  2,025,061
MACHINE FOR CLOSING CANS
Filed Nov. 15, 1933  16 Sheets-Sheet 6
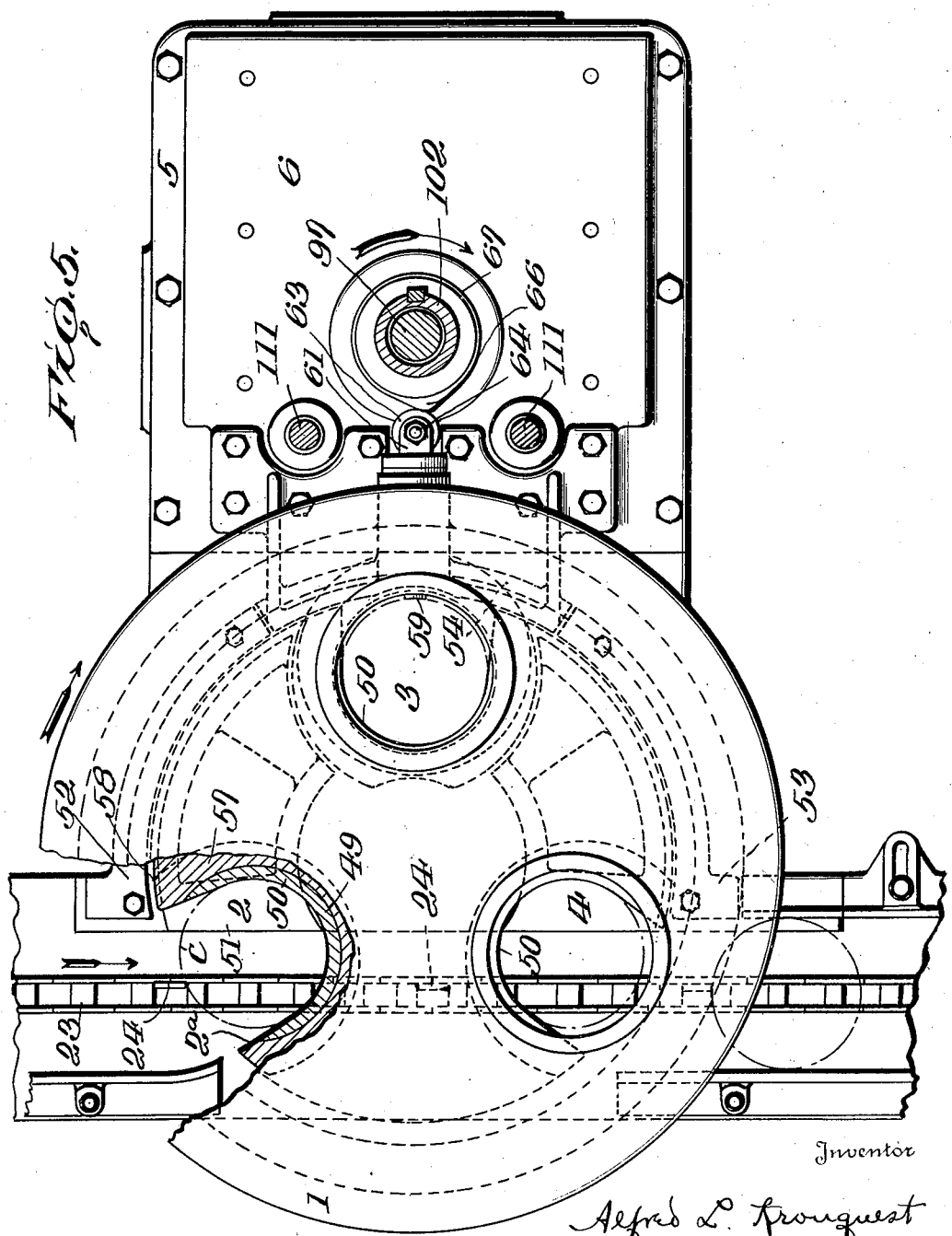

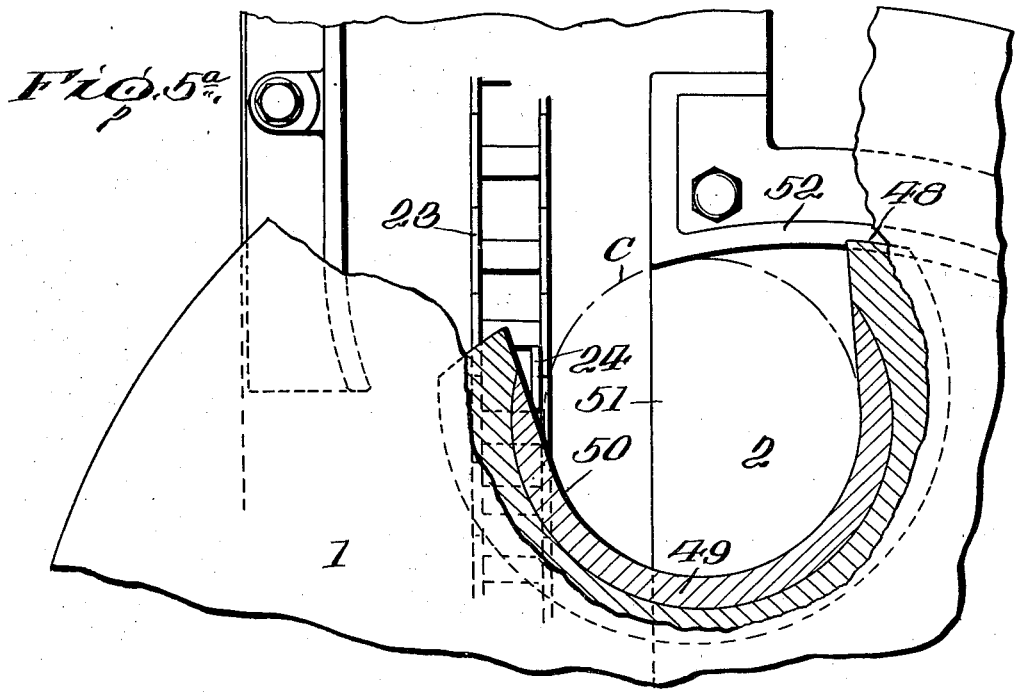
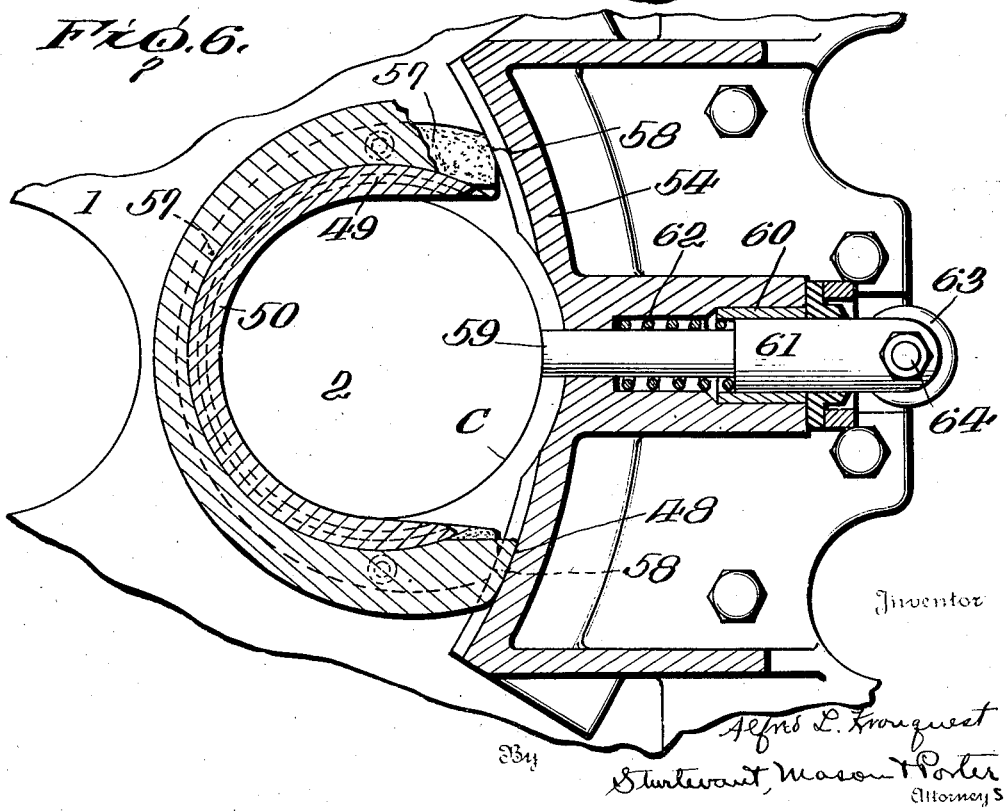

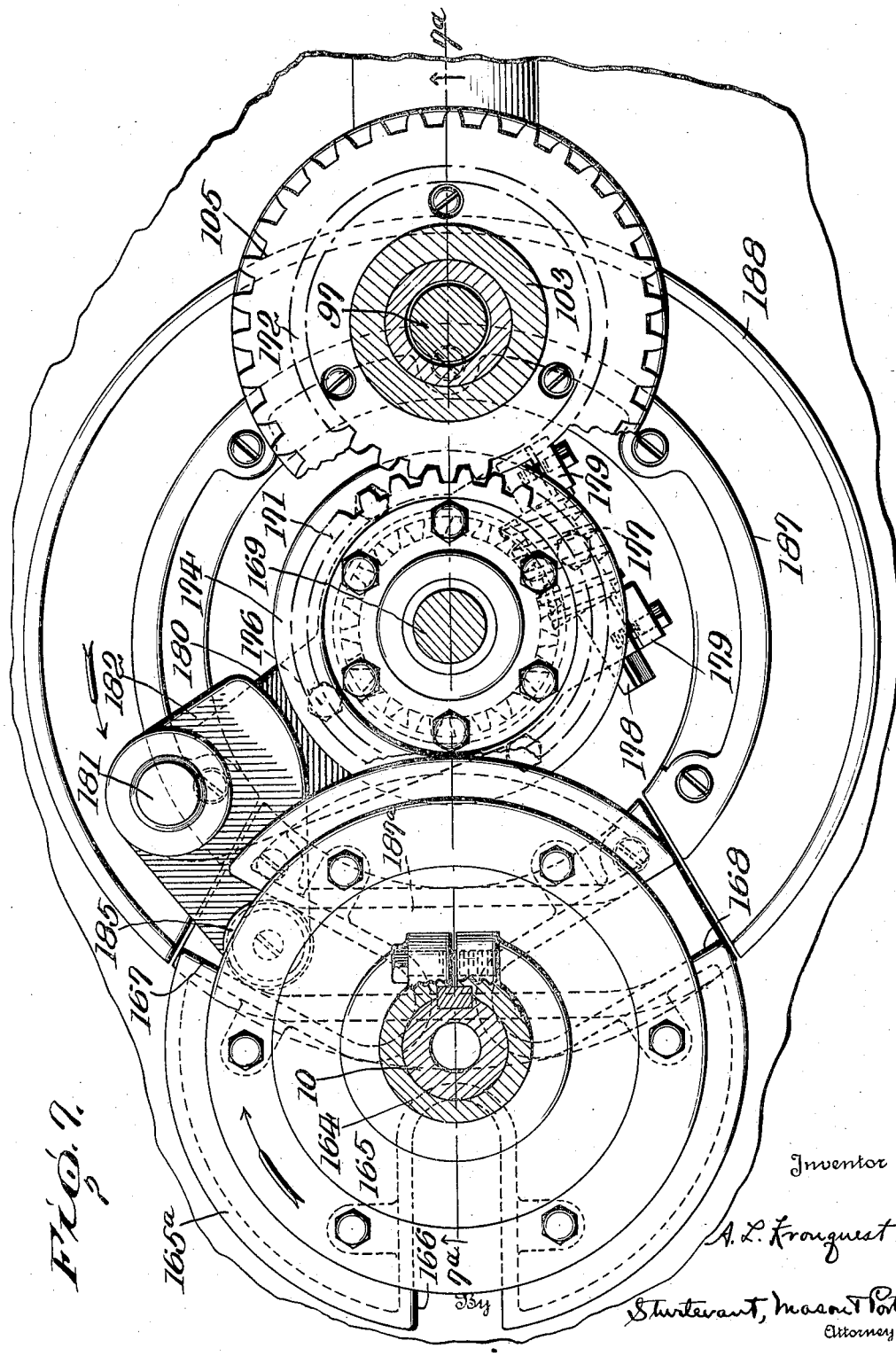

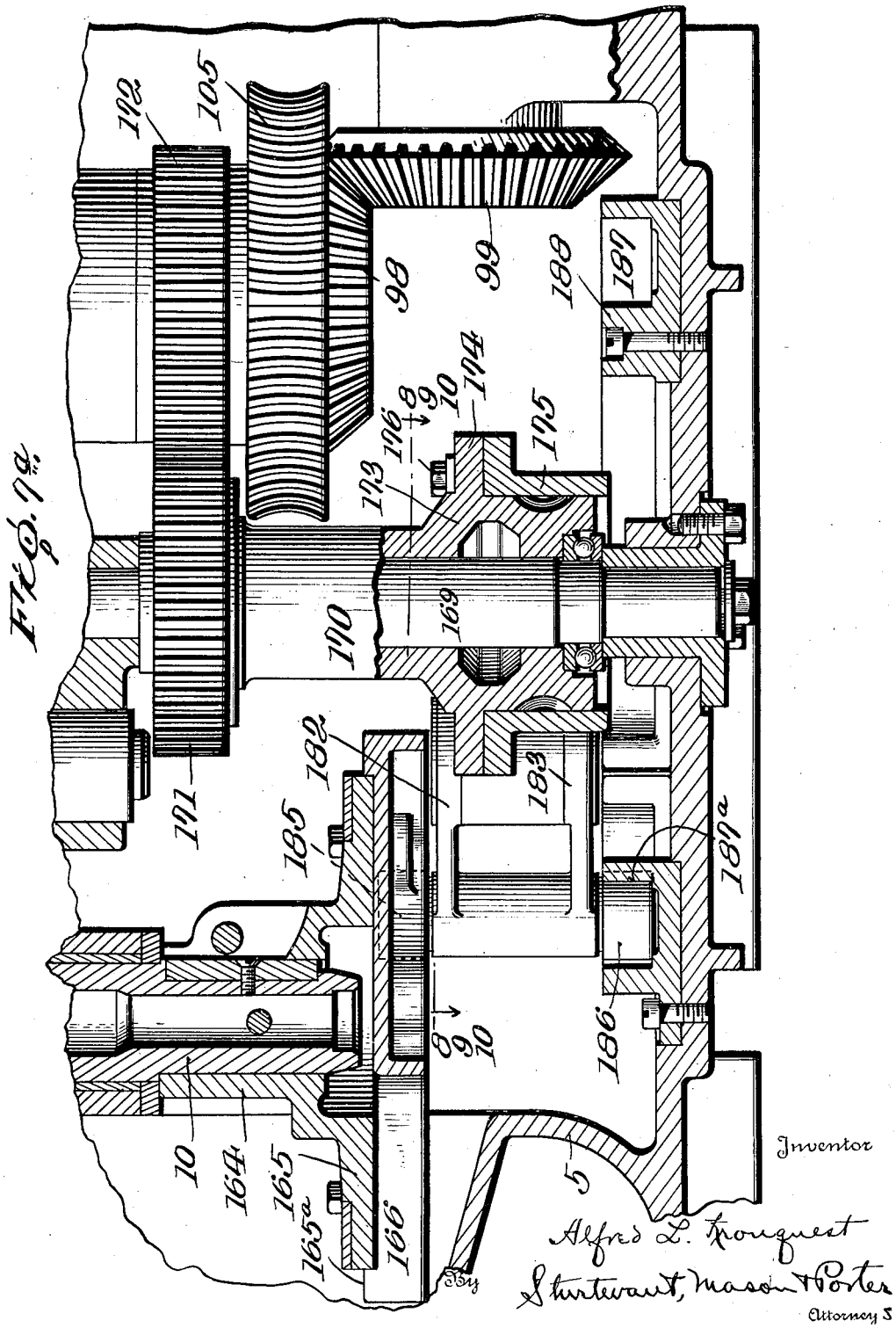

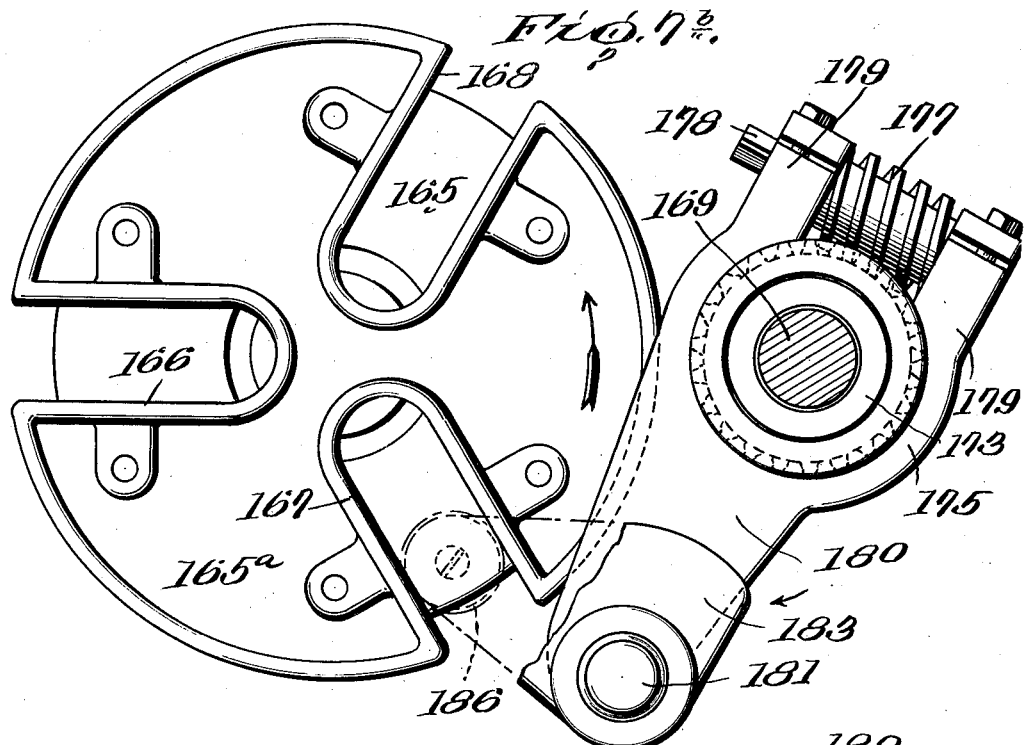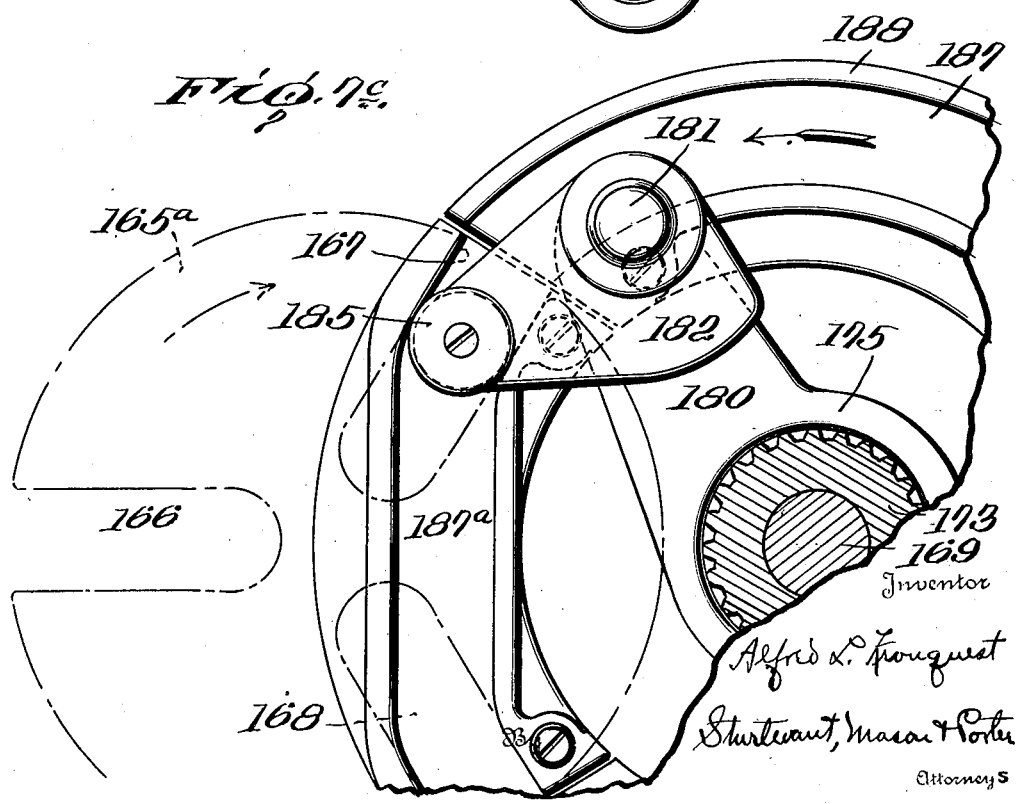

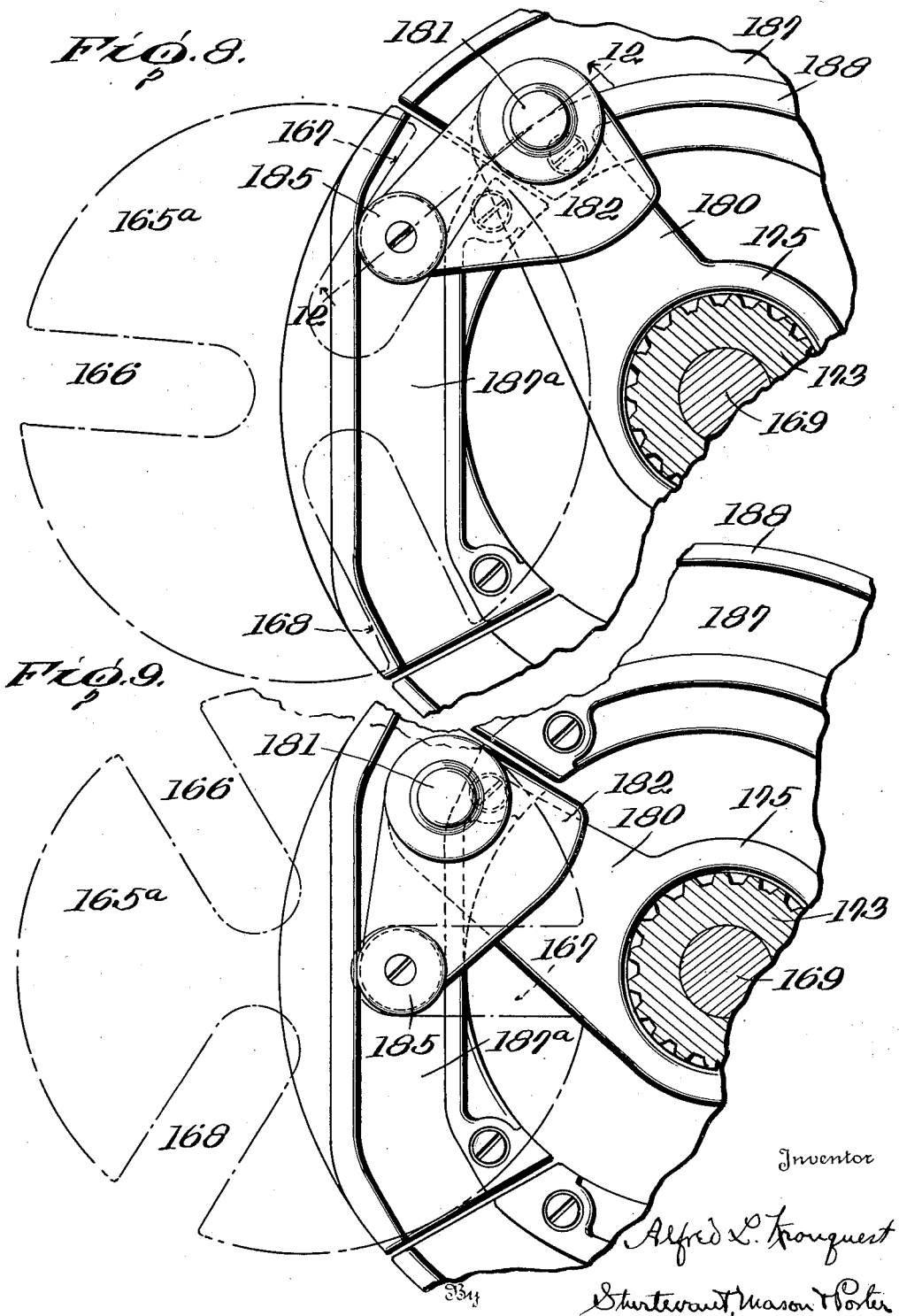

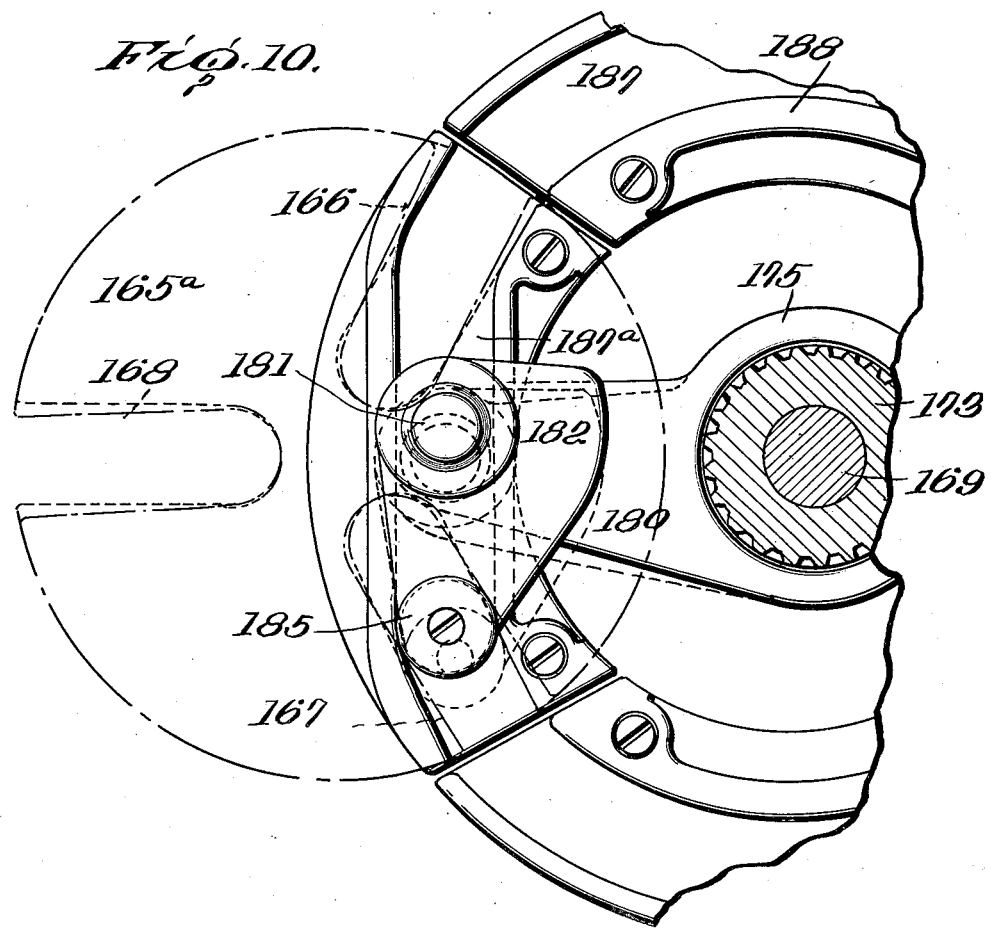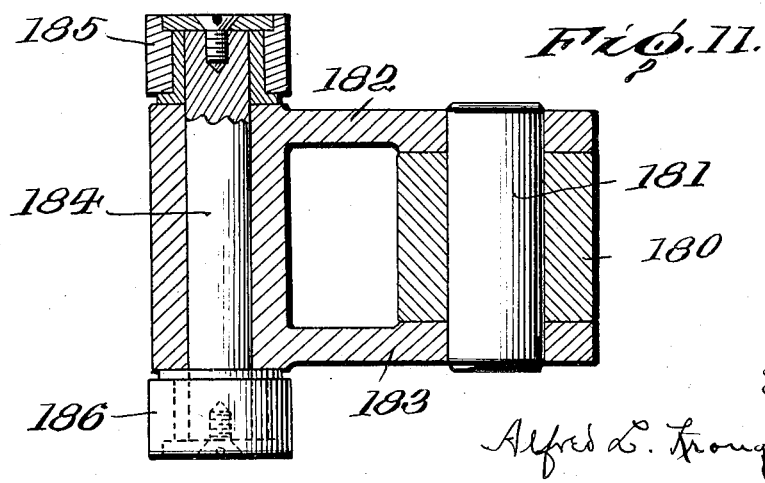

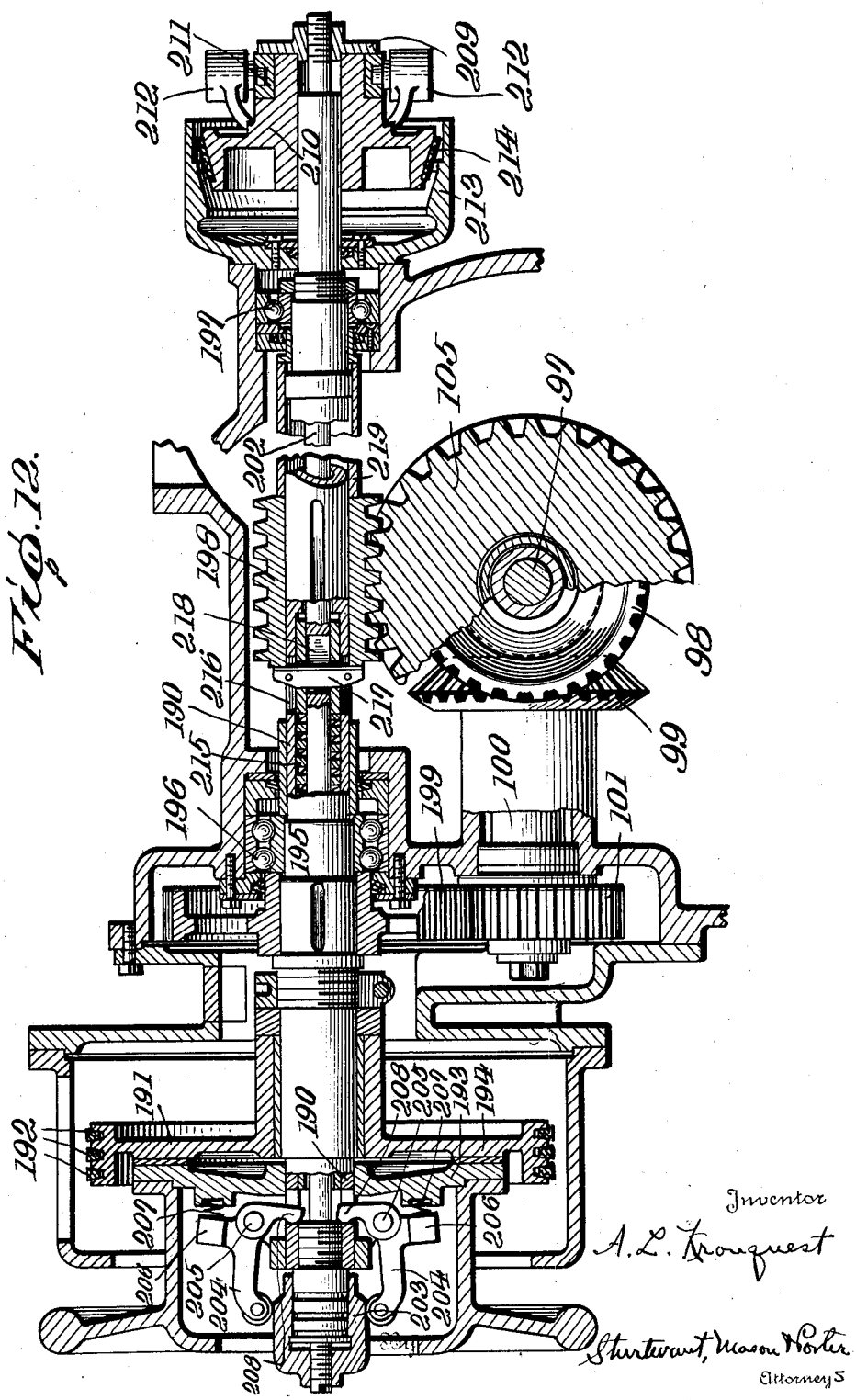

Dec. 24, 1935.  A. L. KRONQUEST  2,025,061
MACHINE FOR CLOSING CANS
Filed Nov. 15, 1933  16 Sheets-Sheet 14
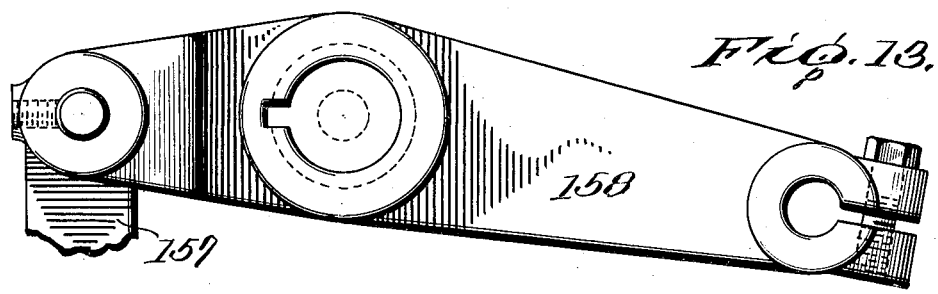
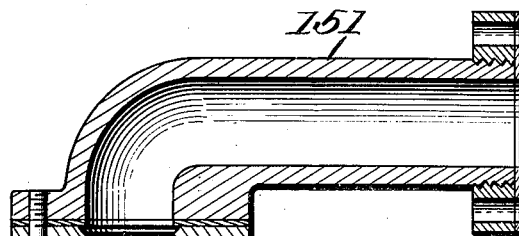
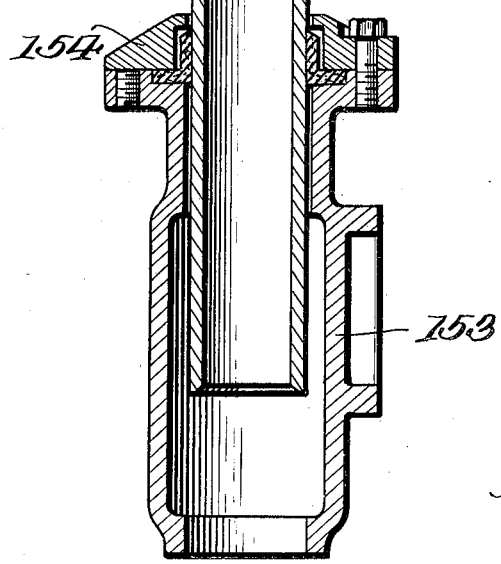
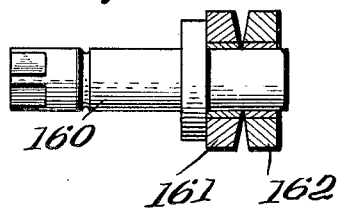
Inventor
Alfred L. Kronquest
By Sturtevant, Mason & Porter
Attorneys

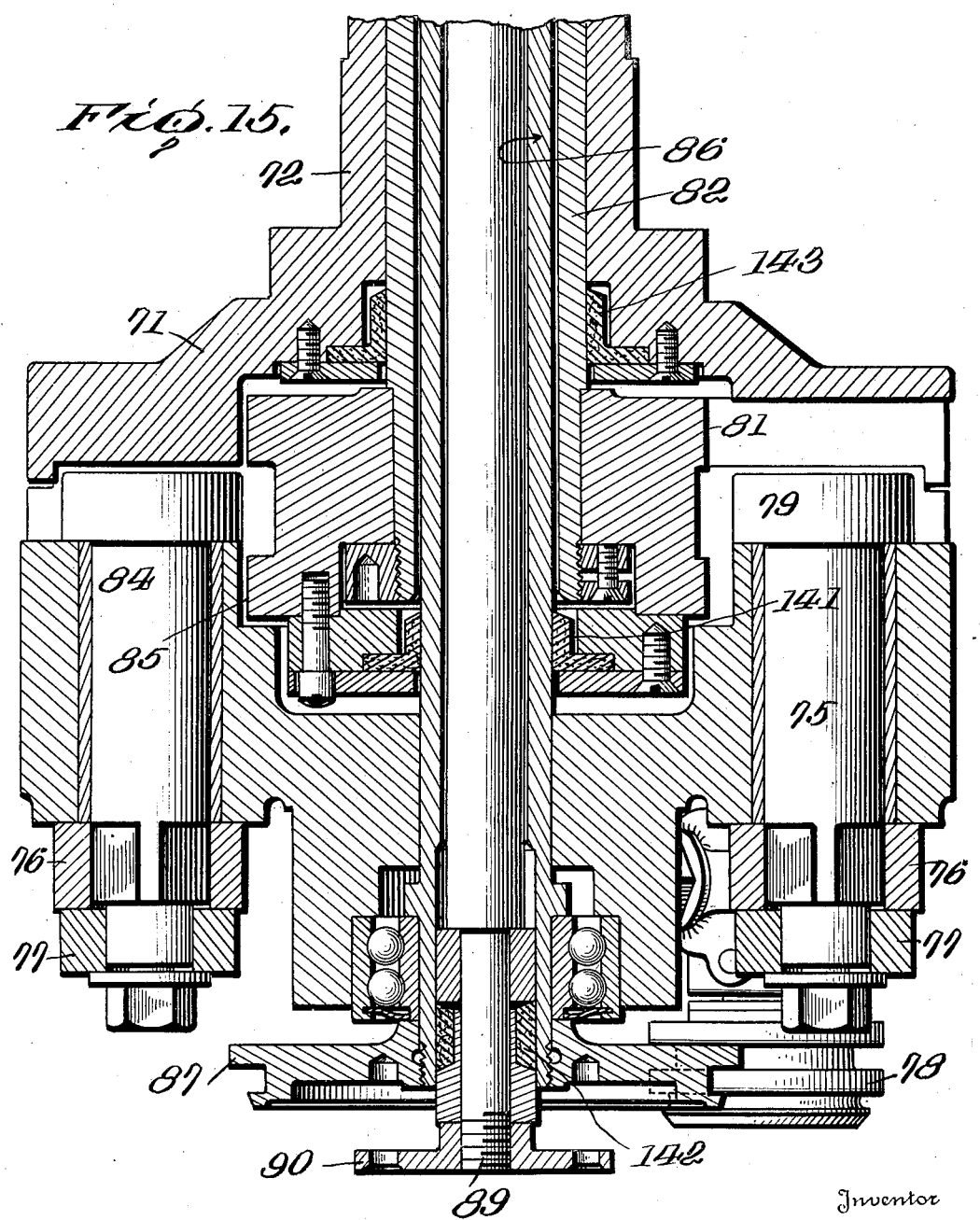

Dec. 24, 1935.  A. L. KRONQUEST  2,025,061
MACHINE FOR CLOSING CANS
Filed Nov. 15, 1933  16 Sheets-Sheet 16
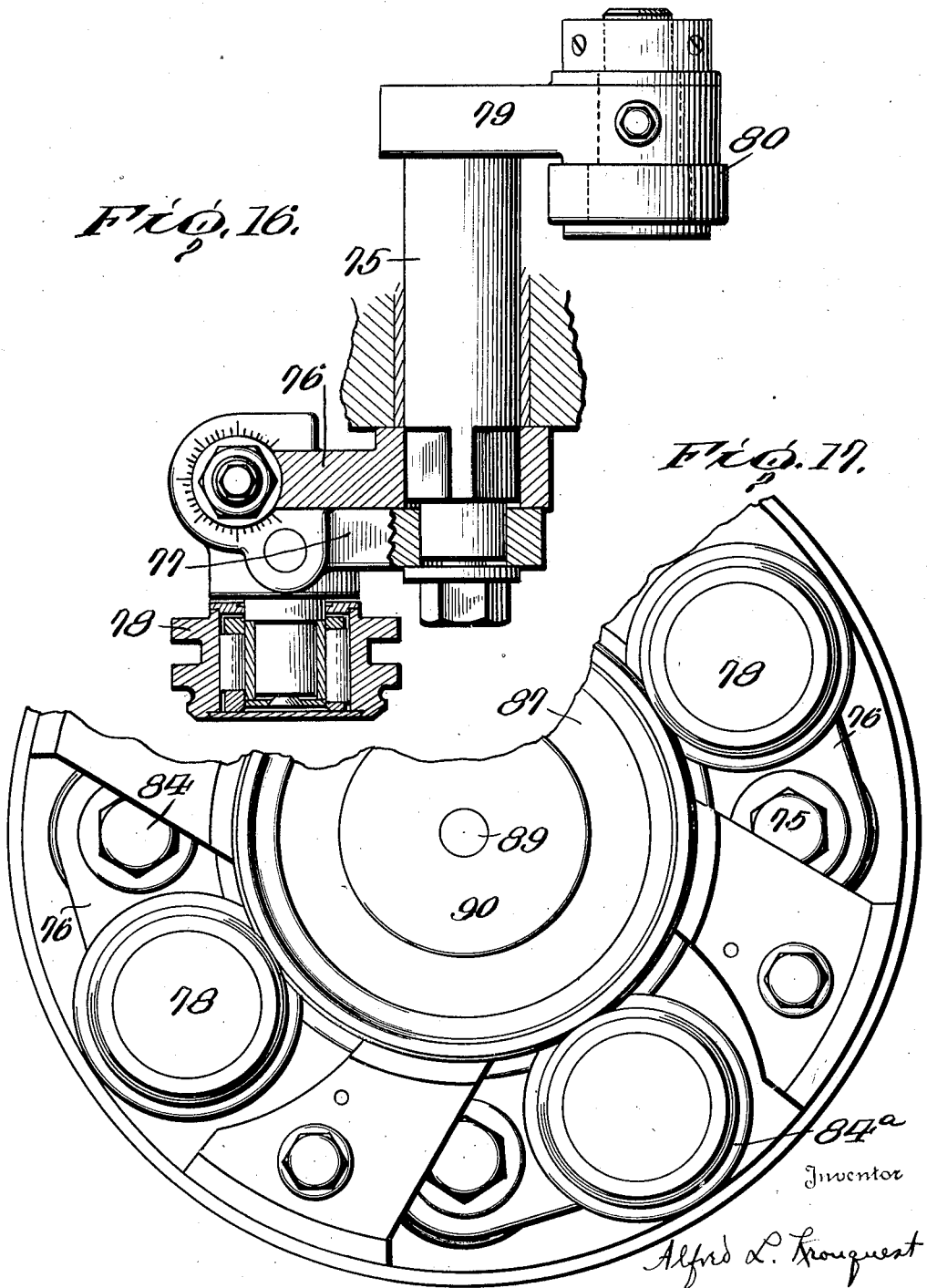

Patented Dec. 24, 1935

2,025,061

UNITED STATES PATENT OFFICE 2,025,061

MACHINE FOR CLOSING CANS

Alfred L. Kronquest, Syracuse, N. Y., assignor to Continental Can Company, Inc., New York, N. Y., a corporation of New York Application November 15, 1933, Serial No. 698,206

15 Claims. (Cl. 113—24)

The invention relates to new and useful improvements in a machine for closing cans in vacuum or following a gassing operation.

An object of the invention is to provide a machine for closing filled cans in vacuum, wherein the cans are taken from a straight line of travel one at a time to a closing mechanism, quickly enclosed in a chamber and vacuumized prior to sealing, and then returned to said line of travel.

A further object of the invention is to provide a machine of the above type wherein said cans are conveyed to and from the seaming mechanism by an intermittently rotating turret having pockets open at the periphery of said turret for receiving and housing the cans.

A still further object of the invention is to provide a machine of the above type wherein the turret is moved bodily into sealing contact with a support for the cans and a shoe for closing the pocket at the seaming station by a bell which houses the seaming mechanism.

A still further object of the invention is to provide means for giving to said turret a relatively quick starting movement as it takes the can from in front of a feed dog, and a relatively slow stopping movement as the can comes to rest at the seaming station.

Still another object of the invention is to provide a driving clutch for said turret which is automatically released in case of a jam, and manually restored to normal driving condition when the jam is removed, and the turret released for movement.

These and other objects will in part be obvious and will in part be hereinafter more fully disclosed.

In the drawings which show by way of illustration one embodiment of the invention—

Figure 3:
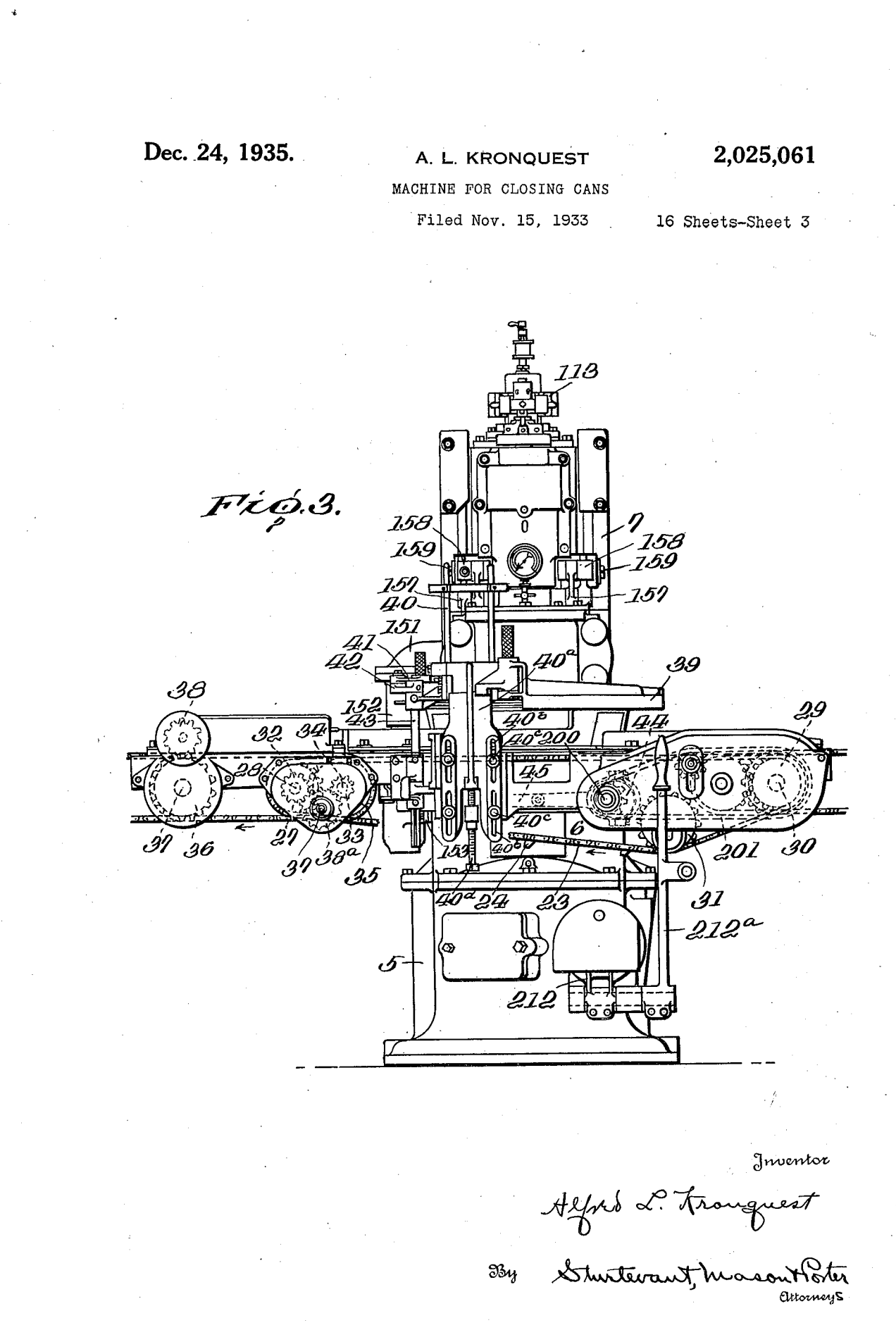

Fig. 3 is a front elevation of the machine;

Fig. 4 is a vertical sectional view on an enlarged scale through a portion of the bell, the seaming mechanism, the turret, the can support and the shoe which closes the pocket in the turret that is beneath the bell;

Fig. 4a is a view on an enlarged scale showing in vertical section a portion of the bell, the turret, the shoe for closing the pocket of the turret and the can support, with the bell raised;

Fig. 4b is a view similar to Fig. 4a, but showing the bell lowered and the can raised into engagement with the chuck of the seaming head;

Fig. 5 is a view partly in section showing the turret in plan with parts broken away to illustrate the manner of feeding the can into the pocket;

Fig. 5a is a view partly in plan and partly in section showing a portion of the turret, the feed chain, and the camming action of the wall of the pocket on the can for removing the same from in front of the feed dog;

Fig. 6 is a view partly in plan and partly in vertical section on the line 6—6 of Fig. 4;

Fig. 7 is a sectional view through the lower part of the machine and showing in plan the actuating mechanism for intermittently rotating the turret;

Fig. 7a is a vertical sectional view through the operating mechanism for the turret;

Fig. 7b is a bottom plan view of the driving wheel for the turret and the operating devices associated therewith;

Fig. 7c is a view partly in section and partly in top plan showing the position of the operating mechanism as it initiates the movement of the turret;

Fig. 8 is a view similar to Fig. 7c, but showing the turret as started on its intermittent movement;

Fig. 9 is a view similar to Fig. 8, showing the turret as having been turned through substantially half of its intermittent movement;

Fig. 10 is a view showing the turret as having nearly completed its movement, and in dotted lines the deceleration of the turret as it comes to its final position;

Fig. 11 is a detail showing the device mounted at the end of the arm which carries the actuating roll and the control roll therefor;

Fig. 12 is a horizontal sectional view through the automatic clutch releasing and restoring device for driving the turret;

Fig. 13 is a detail showing in side elevation the lever for operating the valve controlling the vacuum and also gassing, if it is used;

Fig. 13a is a detail showing the rollers carried by the lever which controls the vacuum and gassing;

Fig. 14 is a vertical sectional view showing the vacuum pipe connection and the manner of adjusting the same when the seaming head is shifted to different set positions for cans of different heights;

Fig. 15 is a vertical sectional view through the seaming head;

Fig. 16 is a view partly in vertical section and partly in side elevation showing one of the seaming units;

Fig. 17 is a bottom plan view of a portion of the seaming head, and

Fig. 18 is a detail in vertical section showing a modified form of construction of valve with the gas supply.

Figure 1:
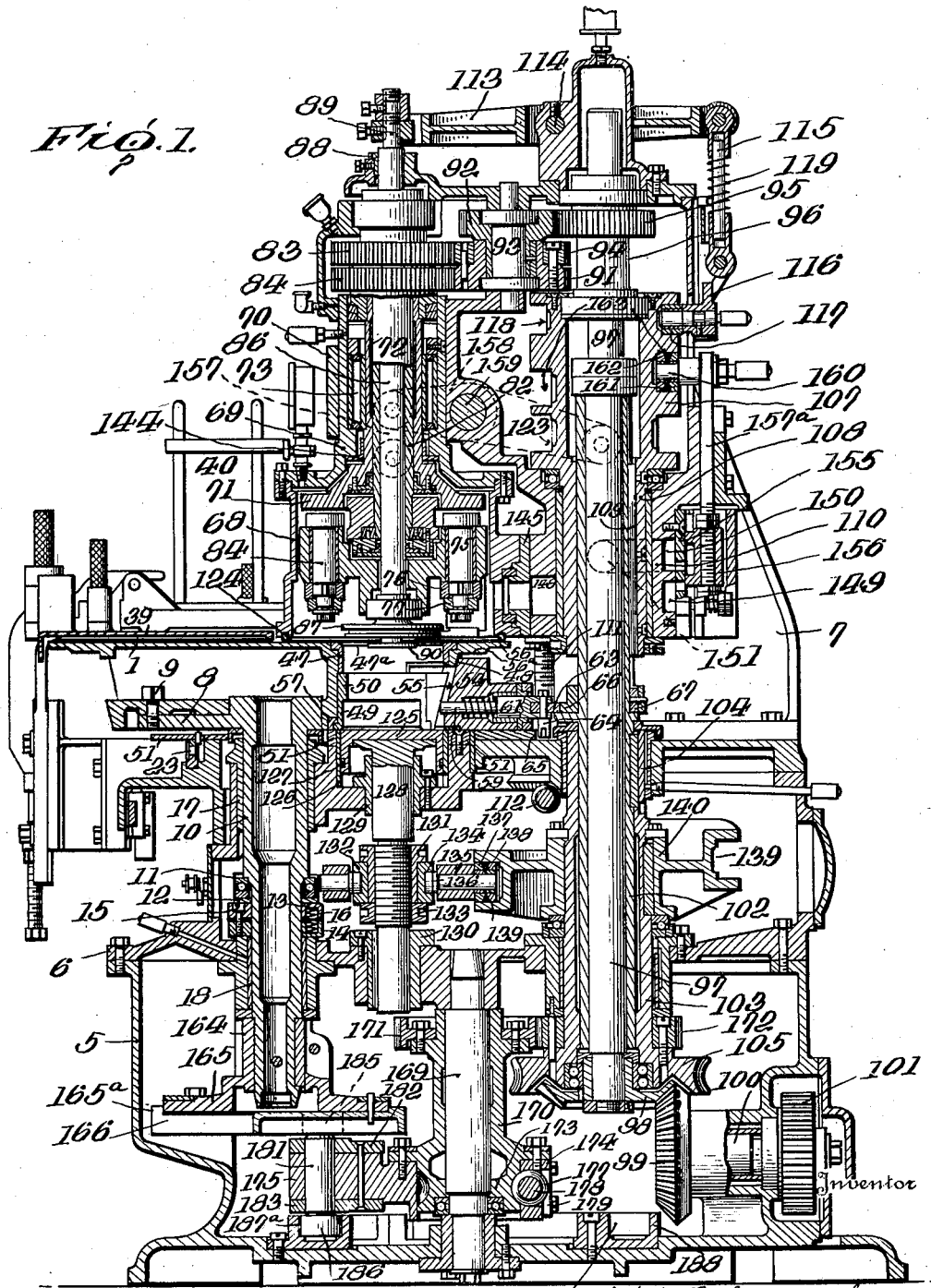
Figure 1 is a vertical sectional view through a closing machine embodying the invention and taken substantially at right angles to the line of feed of cans to and from the machine.

The invention has to do with a machine for closing cans and in particular with a machine wherein the cans are enclosed one after another in a chamber which may be placed under vacuum, or wherein the vacuum may be replaced with an inert gas. There is a seaming station which, as illustrated in the drawings, includes seaming rolls for double-seaming a can end to the can body. The cans are moved to and from the seaming station by an intermittently rotating turret provided with pockets opening at the periphery of the turret. The turret is of sufficient height to completely house the can which is to be closed so that the turret pocket after it reaches the seaming station may be converted into a vacuum chamber. The outer face of the turret is tapered and increases in diameter from its lower surface toward the upper surface thereof. At the seaming station is a shoe which is stationary, and which has a tapered surface conforming to that on the turret. Beneath the turret is a can support. The turret is not only intermittently rotated, but it is yieldingly raised a fraction of an inch so as to be out of contact with the can support and the shoe while it is rotated. The seaming mechanism is housed within a bell which is moved downwardly into contact with the turret after the turret comes to a standstill with the turret pocket beneath said seaming mechanism. This downward movement of the bell contacting with the turret presses the turret down into contact with the shoe and the can support, thus completely enclosing the turret pocket and converting the same into a chamber which may be put under vacuum, and wherein the vacuum may be replaced with an inert gas, if desired. The can support includes a movable disk on which the can is placed when directly beneath the chuck, and this disk lifts the can into engagement with the seaming head for the seaming operation, and it also moves into the turret pocket and locks the turret against any accidental movement until after the seaming operation when the can is lowered. The turret is intermittently rotated by a driving mechanism which is so constructed that said turret is given a relatively quick starting movement and a relatively slow stopping movement. The driving mechanism also is of a character so that the turret may be rotated through an arc of one hundred and twenty degrees as the can is removed from the feed chain and placed beneath the seaming head. This provides a relatively long period at which the turret may be stationary and while the can is being treated and sealed. The turret is operated by a driving mechanism which includes a clutch and automatic devices for releasing the clutch in case of a jam so that the turret is stopped, and this automatic releasing mechanism is also automatically restored when the jam is removed and the turret permitted to turn.

It is thought that the invention will be better understood by a detail description of the illustrated embodiment thereof, it being understood, however, that the invention is not limited to the details disclosed. The machine includes a seaming station where the can is placed under vacuum or gassed and sealed, a loading station where the cans are taken from a straight line of travel by an intermittently rotated turret and conveyed to the seaming station, and a discharge station where the turret again delivers the can to the traveling devices which brought the can to the turret.

The turret is indicated at 1 in the drawings. It is provided with three pockets indicated at 2, 3 and 4 in Fig. 5 of the drawings. The turret is of greater height than the can which is to be closed, and the can is fed into one of these pockets and delivered thereby to the seaming mechanism and removed from the seaming mechanism after the sealing of the can.

The machine includes a lower housing 5 which is provided with a supporting base, an intermediate housing 6 which is bolted thereto, and an upper housing 7. The turret is mounted for rotation in bearing sleeves supported by the housing 6. The turret is secured to a disk 8 by bolts 9. This disk 8 is carried at the upper end of a shaft 10. The shaft 10 rests on a ball bearing 11 which engages beneath a shoulder on the shaft. This ball bearing 11 is mounted in a suitable supporting cup 12 which rests on the upper face of a sleeve 13. There is a sleeve 14 mounted on the end carried by the housing 6, and bolts 15 pass through the supporting cup and the sleeve. The sleeves 13 and 14 are provided with a series of opposed recesses on which springs 16 are located. The head of the bolt is spaced away from the sleeve 14 sufficiently so that the springs will lift the turret a fraction of an inch. Thus the turret during the turning thereof is yieldingly supported by these springs, but when pressure is applied to the turret, it can move downward to a limited extent. The shaft 10 is journaled for rotation in the bushings 17 and 18. The turret is given an intermittent movement by a mechanism which will be described in detail later.

The filled cans are delivered on to the table 19 (see Fig. 2) by a suitable conveying mechanism which includes a feed chain running over a sprocket wheel 20. It is taken from this feed chain by a pair of feed chains 21 and 22 which deliver the can to the feed chain 23. This feed chain 23 is provided with spaced feed dogs 24 and it is essential that the cans shall be placed in proper timing in front of the feed dog as it moves above the table into the position to receive and feed the can. This is accomplished by a timing screw 25 which has a spiral vanishing thread thereon, and the cans are held against this timing screw by a yielding guide 26. The timing screw will accelerate the can and bring it into proper position for the feed dog 24 to engage the same. The feed chain 23 runs over a sprocket wheel 27 carried by a shaft 28 (see Fig. 3). It also runs over a sprocket wheel 29 on the shaft 30. This feed chain also runs over a sprocket wheel 31 which may be shifted for placing said feed chain under proper tension. The shaft 28 is provided with a gear 32 which drives the gear 33 on the shaft 34 through a gear 38a and this shaft 34 carries sprocket wheels over which the feed chains 21 and 22 run. The shaft 37 also carries sprocket wheels over which the feed chains 21 and 22 run. These feed chains not only serve to feed the containers, but they serve to impart motion from the shaft 34 to the shaft 37. The shaft 37 carries a gear 36 which meshes with a gear 38 on a cross shaft, and this cross shaft in turn drives the timing screw. This provides a feeding mechanism whereby the cans are fed on to the table 19 and then along the table and timed into engagement with the feed dogs 24 of the feed chain which delivers the filled cans to the pockets in the turret. This same feed chain removes a can from a pocket in the turret after it has been closed, and it is the same feed dog that places the can in a pocket of the turret that takes the same can from the pocket of the turret. The feed chains move continuously, but the turret moves intermittently, and there is a sufficient time interval after the can is removed from the feed dog for the conveying of the same to the seaming mechanism, the sealing of the can, and the bringing of it back to the path of travel of the feed dog. This feed dog travels in a straight line path as it conveys the cans to and from the turret.

Located immediately above the turret is a guard plate 39 which may be moved to one side to give access to the turret. A stack holder 40 for covers is mounted on a supporting bracket attached to the frame of the machine. The stack holder is hinged to the top of the bracket so that it may be swung away from its position over the turret. The bracket is provided with slots through which bolts pass for attaching the same to the frame, and this permits the bracket to be adjusted to different heights for different sizes of cans. The bracket is indicated at 40a, the slots at 40b and the bolts at 40c. When the bolts are loosened, the bracket may be adjusted by means of an adjusting screw 40d. This stack holder may be of any desired character. It is provided with holding dogs 40' which are oscillated for releasing the covers or ends one at a time so that they drop on to the can placed beneath the same by the feed chain. The can is at this time in the pocket of the turret so that the cover drops into the turret pocket on to the can in said turret pocket. The means for releasing the covers one at a time include the usual oscillating ring which is operated by a link 41 connected to an arm 42 carried by a shaft 43. It may be stated briefly that this shaft 43 is oscillated by means of an eccentric 44 with which an eccentric strap cooperates, and the eccentric strap is in turn connected to the rod 45, and this rod 45 is adapted to be connected to the shaft 43 for oscillating the same whenever there is a can placed in the pocket to be closed. The can as it passes along the table 19 comes into contact with a movable guide 46, and as this guide is shifted away from the feed chain through the action of the can contacting therewith, it will operate through a suitable control means so as to bring about a connection of the rod 45 to the shaft 43. If there is no can to be closed, then the guide 46 will not be moved and no cover will be released. This cover feed is of the usual construction and further detail description thereof is not thought necessary.

Referring to Fig. 5 of the drawings, the feed dog conveying the can into the pocket of the turret is indicated at 24. The can is indicated at C. The turret is at a standstill when the can begins its entrance into the pocket, and the pocket is so shaped that the wall 2a thereof will force the can laterally off from the dog 24. When the turret begins its movement, it will remove the can from in front of the feed dog 24. The can is sufficiently at one side of the feed dog so that the movement of the can in a circular path about the center of the turret does not interfere with the forward travel of the feed dog. The can is taken away from in front of the feed dog as fast or a little faster than the feed dog moves forward.

The turret, as shown in Fig. 5, at its upper face is circular, and the pocket for the can extends all the way from the upper face of the turret to the lower face thereof. Said pocket is located back from the peripheral edge of the upper part of the turret. The pocket is circular and extends all the way through this upper part. A ring liner 47 (see Fig. 4) is placed in this opening at the upper face of the turret. At a slight distance below the upper face of the turret, the peripheral wall of the turret is inset, as indicated at 48. The pocket is open at the peripheral wall 48, as is clearly shown in Figures 5 and 5a. There is also a ring liner 49 inserted in the pocket, which liner is provided with a centering rib 50 with which the can makes contact when properly seated in the pocket for the lifting of the same into engagement with the chuck of the seaming mechanism. This centering rib 50 is disposed so as to engage the can above the lower double seam and below the flange on the can, and is of sufficient thickness so that the flange of the can body and the cover or end resting thereon, does not contact with the ring liner 47. In Fig. 6, the can body is shown in the pocket with the cover applied and placed against this centering rib ready to be lifted into contact with the chuck of the seaming mechanism. The ring liner 47 is provided with a tapered portion 47a, so that when the cover is released, this tapered portion will guide the cover into the ring liner 47, and the cover will fall so as to rest on the can body. Inasmuch as this ring liner 47 extends all the way around the cover, the air in the pocket will dampen the fall of the cover on to the can body so that there is no rebounding of the cover therefrom.

The filled can as it is fed into the pocket rests on a can support indicated at 51. This can support extends all the way around the turret center from the receiving station, through the seaming station and to the delivery station. The feed dog extends a slight distance above this can support 51 at both the receiving station and the delivering station. The upper face of this can support tapers upwardly gradually so that the can is raised as it is moved along the support and brought to the seaming station. This is shown in Fig. 4, where the pocket, which is sectioned, is at the seaming station. This enables the turret to pass over the feed dogs without contact therewith, and with sufficient clearance so that the turret may be depressed so as to bring it into contact with the can support at the seaming station without bringing it into the range of movement of the feed dog 24, which as noted, must be above the can support at the receiving and delivering stations. The can support along which the cans are moved is shown in plan in Fig. 5a of the drawings. The can is retained in the pocket as the turret moves the same from the receiving station to the seaming station by means of a guide rail 52, and it is also guided to the delivering station by a guide rail 53. Located between the two guide rails 52 and 53 is a shoe 54. This shoe 54 has a tapered face 55 which conforms to the tapered face 48 of the turret, that is, they are parallel. The turret face increases in diameter from the lower side of the turret to a point adjacent the upper side of the turret, leaving a projecting portion 56 which overlies the shoe 54. When the turret is in raised position, it is out of contact with the shoe, and it is also out of contact with the can support beneath the turret in the region of the seaming station. When, however, the turret is forced downward, the tapered faces 48 of the turret will contact with the tapered face 55 of the shoe, and these faces are so machined that the contact which is made by a downward pressure on the turret is a sealed contact. The under face 56a of the projecting ledge at the upper part of the turret does not contact with the upper face of the shoe 54. The contact is solely through the tapered faces of the two parts.

Attached to the turret is a sealing gasket 57. This sealing gasket is held in place in the turret by the ring liner 49. The sealing gasket projects below the lower face of the turret. The sealing gasket extends all the way around the pocket and the ends 58 thereof make contact with the shoe 54 when the turret is depressed. The downward movement of the turret will, therefore, seal the open side of the pocket at the periphery of the turret through the contact of the turret with the shoe 54. It will also seal the lower side of the pocket through the contact of the gasket 57 with the can support beneath the turret.

In order that the can may be placed against the centering rib 50, a seating rod 59 is provided. This seating rod is mounted for reciprocation in the shoe 54. Said shoe is provided with a bushing 60, and the rod is carried by the head 61 which slides in said bushing. There is a spring 62 which normally withdraws the seating rod, so that its outer end is flush with the surface of the shoe or completely housed within the shoe. A roller 63 is mounted on a pin 64, which pin slides in a groove 65 in a plate carried by the frame. This is for preventing the head 61 from turning and thus holding the roller 63 so that it will rotate about a vertical axis. A cam 66 is mounted on a sleeve 67 which is rotated, and this cam 66 operates at the proper timing in the movement of the turret so as to force the seating rod 59 against the can and the can in turn against the centering rib 50.

Located above the turret is a bell 68 which is fixed to a sleeve 69 mounted for reciprocation in a supporting bracket 70 carried by the upper housing. Located within this sleeve 69 and the bell is the seaming mechanism. Said seaming mechanism includes a seaming head 71 carried by a sleeve 72. Located between the sleeve 69 and the sleeve 72 are roller bearings 73. These roller bearings are attached to and move with the bell in its reciprocating movement. The sleeve 72 of the seaming head is provided with a gear wheel 84 at its upper end. This gear wheel 84 is used for rotating the head. Mounted on the seaming head and rotating therewith are the seaming rolls. The seaming head is provided with a short vertical shaft 75 carrying at its lower end an arm 76 which is fixed to the shaft and an arm 77 which may be adjusted on the shaft. Mounted on the arm 77 is a first-operation seaming roll 78. The two arms 77 and 76 are connected by an adjusting mechanism which enables the seaming rolls to be shifted to different set positions relative to the arm 76 and the shaft which supports the same. At the upper end of this shaft 75 there is an operating arm 79 carrying a roll 80 which engages a cam 81 carried by a sleeve 82 mounted in the seaming head sleeve 72 so that it may be rotated therein. At the upper end of the sleeve 82 is a gear wheel 83 which is utilized for rotating the can. On the other side of the seaming head is a shaft 84 which is provided with a similar first-operation seaming roll and with a similar operating arm and roll 80 contacting with the cam 81. Likewise, mounted on the seaming head are shafts of a similar character carrying the second-operation rolls. On of these second-operation rolls is indicated at 84a in Fig. 17. The operating arms for the second-operation seaming rolls carry rollers which engage the cam 85. The cams 81 and 85 are driven at a differential speed relative to the rotation of the head, and said cams are so shaped as to move the first-operation rolls into engagement with the can parts for their seaming operation, and then the second-operation seaming rolls into engagement with the can parts for finishing the seaming operation.

Located within the sleeve 82 is a fourth sleeve 86 on which is mounted a chuck 87. This chuck engages a can end or cover when the can is lifted, seating the same in the can body and holding the can end and body from rotation, while the seaming rolls travel about the end for joining the same to the can body. The sleeve 86 carrying the chuck is keyed to the bracket 88 forming a part of the upper housing. Extending through the sleeve 86 is a rod 89 carrying a pad 90 at its lower end. This rod is reciprocated and operates to seat the cover or end in the can body as it is raised into engagement with the chuck, and also operates to forcibly strip the can from the chuck after it is sealed. The means for rotating the seaming head, the operating cams for the seaming rolls, and for reciprocating the ejector pad and bell will now be described. The gear wheel 84 meshes with a gear 91 formed as a part of a sleeve which is fixed to a gear 92 mounted for rotation about a fixed shaft 93. There are ball bearings between this gear 92 and the fixed shaft. The gear 83 meshes with a gear 94 which is fixed to the gear 91. The gears 94 and 91 have a different number of teeth, so that while both the seaming head and the control cams for the seaming rolls are rotated by this one gear 92, said head and cams are given a differential movement. The gear 92 meshes with a gear 95 carried by a sleeve 96 which is keyed to the shaft 97 so as to rotate therewith. This sleeve 96 is, however, capable of endwise movement on the shaft 97. The shaft extends down through the housings to a position close to the base of the machine where it is provided with a bevel gear 98 meshing with a bevel gear 99 carried by a cross shaft 100. This cross shaft 100 is provided with a gear 101. The rotating movements of this gear 101 are thus transmitted to the vertical shaft 97, and from the gear 95, the seaming head and the control cams for the seaming rolls are rotated.

Surrounding the shaft 97 is a sleeve shaft 102. This sleeve shaft extends through a driving sleeve 103 which is keyed to the sleeve shaft by a key 104. At the lower end of the driving sleeve 103 is a worm gear 105 through which said driving sleeve is rotated, and the driving sleeve imparts rotation to this sleeve shaft 102. There is a ball bearing 106 between the worm gear 105 and the bevel gear 98, as the sleeve shaft and the central shaft 97 are rotated at different speeds. It is desirable to rotate the seaming head at a relatively high speed for performing its seaming operations, while it is desired to operate the parts which are moved once during each seaming cycle at a slower speed. Mounted on this sleeve shaft 102 are control cams for reciprocating the stripper pad, and also for reciprocating the bell. These control cams are formed in a sleeve member 107 which is provided with an extension sleeve 108. This extension sleeve is connected by a key 109 to the sleeve shaft 102. The extension sleeve 108 is journaled in the frame parts carrying the seaming head and the bell. While these frame parts form a part of the upper housing, they can be raised and lowered in the upper housing for positioning the seaming head and the bell for operation upon cans of different heights. The frame parts are indicated in general by the numeral 110. This keyed connection between the control cams and the sleeve shaft 102 is for the purpose of permitting the control cams to be raised and lowered in the seaming head. Likewise, the keyed connection between the gear sleeve 96 and the central shaft 97 is for the purpose of permitting this gear 95 to move up and down on its shaft with the seaming head and the control cam thereof. The frame parts designated by the numeral 110 are raised and lowered by means of an adjusting shaft 111 which is mounted in the housing 6, and when turned it will raise or lower the frame parts carrying the seaming head, the bell, and the control gears and cams therefor. This shaft 111 is rotated by a bevel gear on a horizontal shaft 112 extending to the outside of the frame where it is readily accessible for rotation.

The rod 89 carrying the pad for ejecting the cans from the chuck is adjustably connected to a lever 113. This lever is pivoted at 114 to the frame parts 110, and is connected by means of a link 115 to a slide 116 carrying a roller 117 running in a cam groove 118 in the sleeve member 107. This cam groove 118 is so shaped as to impart reciprocations to the rod 89 in proper timing for seating the cover in the can as it is chucked, and for stripping the can from the chuck at the completion of the seaming operation. The link 115 is made of telescoping sections with a compression spring 119 interposed between the same, the purpose of which is to permit the link sections to yield in case of an obstruction when the slide for operating the ejector pad is raised.

The bell 68 carried by the sleeve 69 is reciprocated by two levers 158. These levers are keyed to a shaft 159, and depending links 157 connected to the outer end of the levers are in turn connected to the bell. At the inner end, each lever carries a stud provided with rollers which run in a cam groove 123. One of these levers is shown in Fig. 13. This cam groove is formed in the sleeve member 107. The cam groove is so shaped that after the turret has brought the can beneath the chuck and stopped, then the bell will move downward, causing the gasket 124 in the lower face thereof to contact with the turret all the way around the pocket, thus making a seal between the bell and the turret and closing the opening leading from the top of the turret into the pocket. The continued downward movement of the bell will compress the springs 16, forcing the turret downward into contact with the sealing shoe 54. It will also cause the gasket 57 to contact with the can support and the shoe, and thus seal the pocket at the periphery of the turret and also seal the pocket at the lower side of the turret. Thus it is that the pocket in the turret is converted into a closed chamber in which the can and cover are housed ready for the vacuumizing or gassing of the chamber and the sealing of the can.

The can support or table beneath the turret is provided with a recessed portion in which is located a can supporting disk 125. Said disk has a depending flange and the recess or pocket in which it is located is provided with a liner 126 which encircles said depending flange. A gasket 127 is located in an annular groove on the depending flange and makes a tight sealed connection between said can supporting disk and the wall of the pocket or recess in which it is located. The can sealing disk is carried by a standard 128 which reciprocates in a bushing 129. The standard extends down below the bushing and through a bushing 130 carried by the housing 6. The standard has a keyed connection to this bushing 130 which prevents it from rotating during its reciprocation. This provides a very efficient support for the can supporting disk, permitting the same to be raised and lowered. Mounted on this standard 128 is a sleeve 131. Said sleeve has a threaded connection with the standard and is adapted to be adjusted thereon to different set positions. The sleeve is provided with a head and surrounding the sleeve bearing against the head is a collar 132. The collar is clamped to the sleeve by a nut 133 which engages a threaded standard, and this serves as a means for locking the sleeve in a set position on the standard. The sleeve is provided with an annular groove 134. Associated with the sleeve is a yoke member 135 carrying pins 136 diametrically opposed to each other and engaging the annular groove in the collar. The pin at one side of the yoke member is extended and is provided with two rollers 137 and 138. The two rollers have their inner faces tapered away from each other so as to avoid contact and they are mounted for independent rotation on the pin. These rollers run in a cam groove 139 formed in a member 140 which is fixed to the driving sleeve 103. As this driving sleeve rotates, the cam groove 139 operating on the rollers will raise and lower the standard and the can supporting disk carried thereby. Two rollers mounted for independent rotation are used because one contacts with the walls of the cam groove 139 closer to the center of rotation than to the other.

The can with the cover resting thereon is brought beneath the seaming head, then the turret stops and remains stationary during the seaming head cycle. The supporting disk for the can is raised, lifting the can into contact with the chuck. The lower end of the liner in the pocket is rounded at its inner corner and the can supporting disk 125 is so dimensioned that as it moves into the pocket, it will center the pocket underneath the head and hold the turret from movement. This occurs before the bell clamps the turret against the can support.

There is a sealing gasket 141 between the sleeve carrying the control cam from the seaming rolls and the sleeve carrying the chuck. There are also sealing gaskets 142 between the rod carrying the ejector pad and the sleeve carrying the chuck. There is a sealing gasket 143 between the sleeve carrying the control cams and the sleeve carrying the seaming head. There is a sealing gasket 144 between the sleeve carrying the head and the sleeve of the bell. Thus it is that the moving parts of the head are all sealed so that the chamber formed by the bell and the pocket is completely sealed when the bell contacts with the turret and forces the turret into contact with the shoe and the can support which is beneath the turret. The chamber thus formed and which encloses the can to be sealed is put under vacuum in the following manner. The bell 68 at the side adjacent the frame parts 110 carries a plate 145 which has a sealed sliding contact with the portion 146 of the frame parts 110. There is a port 147 through this plate, and a port 148 of slightly larger dimensions in the frame, so that the port 147 for all positions of the bell has a wide open connection with the port 148. This port 148 extends around the extension sleeve 108 so that it connects with a port 149. Above the port 149 is a port 150 which is connected to the pipe 151. This pipe 151, as shown in detail in Fig. 14, is attached to a vertical extension 152 which has a telescoping connection with a pipe section 153. There is a gasket 154 located between these sections which serves to produce an airtight seal. The pipe section 153 is connected to a line extending to a vacuum creating apparatus. It may also be connected to a line leading to a source of supply of inert gas, so that either a vacuum may be drawn through said pipe connections, or gas supplied therethrough. There is a cover plate 155 for these ports 149 and 150, and there are smaller ports opening in this cover plate. A valve 156 makes sliding contact with the cover plate and is adapted to connect the port 150 to the port 149 when in one position, and when in another position, it maintains the port 150 closed, but opens the port 149 to the atmosphere.

The valve is connected to a valve rod 157a which slides in the frame parts 110. This valve rod, at its upper end, is provided with a stud 160 carrying rollers 161 and 162 which run in the cam groove 163 formed in the sleeve member 107. As this sleeve member rotates, it will impart reciprocations to the rod and thus to the valve. The cam groove is so shaped as to shift the valve so as to open the chamber to the vacuum creating means immediately upon the closing of the chamber by the downward movement of the bell. The end is loosely applied to the can at this time, so that the vacuum drawn on the chamber will create a vacuum in the can. After the can has been properly vacuumized, then the seaming rolls are moved by the control cam so as to double seam the cover to the can body. After the can is sealed, then the valve is shifted so as to connect the port 149 with the atmosphere, and this will release the vacuum in the bell. The can support is then lowered and the stripping pad moved downward to forcibly strip the can from the chuck. The bell is raised to permit the turret to be lifted by the springs 16 preparatory to the turning of the turret through another step movement for carrying the sealed can to the delivering station, and presenting another filled can with the cover loosely applied to the seaming station. It is sometimes desirable to replace a vacuum with an inert gas. In Fig. 18, there is shown a slightly modified form of construction whereby the bell may be supplied with an inert gas after the vacuum has been produced on the chamber. In this form of the invention, the valve 156 is extended so as to always cover the port 149. A pipe 152a is connected to the extension of the valve, and there is a passage 149a which is brought into register with the port 149 so as to connect said port with the pipe 152a. The pipe 152a is connected through a flexible pipe with a source of gas supply. This pipe 152a can, therefore, move up and down with the valve. When the parts are positioned as shown in Fig. 18, then instead of venting the bell to the atmosphere after drawing a vacuum, it is connected to this inert gas supply so that the vacuum is relieved by the gas. The cam for operating the valve is changed slightly in construction so as to shift the valve to bring about a connection with the gas supply just as soon as a proper degree of vacuum has been drawn on the bell. The supplying of the bell with gas will, of course, break the vacuum, so that as soon as the can is sealed, without any further shifting of the valve, the bell can be raised.

As has been noted above, the frame parts 110 are capable of being raised and lowered and when they are shifted they shift also all of the operating cams and actuated parts for the valve, the ejector pad, the seaming head, the control cams for the seaming head, and the bell. The seaming head and bell are thus positioned for operation upon a can of a different height. The turret must be removed, and this is readily accomplished by disconnecting the turret from the disk to which it is bolted. A different size shoe for sealing the turret is also substituted and this is practically all of the changes necessary in the operating parts in order to change the machine so that it may operate upon cans of different heights.

The means for intermittently rotating the turret will now be described in detail. This operating means is shown in detail in Figures 7, 7a, 7b, 7c, 8, 9, and 10. Attached to the lower end of the shaft 10 is a sleeve 164 at the lower end of which is mounted a disk 165. Bolted to the lower face of this disk 165 is the actuating wheel of the intermittently operating driving mechanism for the turret. This wheel is indicated at 165a and is provided with three radial slots 166, 167 and 168. The centers of these slots are one hundred and twenty degrees from each other. Each slot terminates adjacent the center of the wheel. There is a fixed shaft 169 mounted in the base of the machine, and in the horizontal web of the intermediate housing 6. Mounted for rotation on this fixed shaft is a sleeve shaft 170. Said shaft carries a gear 171 at its upper end which meshes with a gear 172 which is fixed to the driving sleeve 103. The sleeve shaft 170 is provided with a head 173 having a projecting flange 174. There is a ring 175 surrounding the head of the sleeve shaft 170, and resting against the under face of this projecting flange 174. Bolts 176 extend through the flange and are threaded into this ring 175. These bolts are located in slots curved about the center of the shaft so that when the bolts are loosened, the ring 175 may be adjusted about the head of the sleeve shaft 170 to different set positions thereon. The head of the sleeve shaft is provided with a worm gear which meshes with a spiral gear 177 carried by a shaft 178. This shaft 178 is mounted for rotation in spaced lugs 179, 179 carried by the ring 175. The spiral gear is between the lugs and the shaft projects at one end so that a suitable handle may be attached thereto for the turning of the shaft. When the bolts are loosened and the shaft turned, then the ring will be forcibly shifted on the head of the sleeve shaft 170 to a different position thereon, and when the bolts are tightened, it will then be held in its new set position.

Projecting from the ring 175 is an arm 180. This arm 180 carries at the outer end thereof a laterally projecting bracket arm consisting of an upper member 182 and a lower member 183 (see Fig. 11). These members are secured to the arm by a pivot post 181 so that the bracket arm is free to oscillate about this pivot post. This bracket arm carries at its outer end a shaft 184. The shaft 184 projects above the arm and carries a roller 185 which is adapted to enter the radial groove in the driving wheel for imparting movement to said wheel. On the lower end of this shaft 184 is a roller 186 which runs in a cam groove 187 in a cam plate 188. The arm turns with the sleeve shaft 170 and causes the roller 186 to follow around the cam groove 187 in the direction of the arrow in Fig. 7. This cam groove 187 has a section 187a thereof which is eccentric. While the roller 186 is following the concentric portion of the cam groove, the bracket arm will remain in a fixed position on the arm 180. When, however, this roller 186 enters the eccentric portion of the cam groove, then the bracket arm will be swung on the arm 180 and this will move the roller 185 either inward toward the center of rotation of the arm, or outward away from said center. This section 187a of the cam groove as shown in the drawings, extends in a direction substantially at right angles to a line passing through the center of the driving wheel 165a and the center of rotation of the arm 180. When the roller enters the radial groove in the driving wheel, as shown in Fig. 8, it will at once cause the wheel to rotate in the direction of the arrow in Fig. 7. Soon after it has entered this radial groove, the roller 186 passes into the section 187a of the control cam groove, and will cause the roller 185 to move toward the center of rotation of the arm. This movement of the roller 185 toward the center of rotation of the arm will accelerate the movement which is imparted to the driving wheel for the turret. The acceleration will continue until the center of the roller 185 passes the line joining the centers of the driving wheel and rotation of the arm. Then the roller 185 will be moved outward from the center of the arm, and as it moves outward, the movement of the driving wheel will be decelerated.

Inasmuch as the roller which operates the driving wheel for the turret moves toward the center of said driving wheel in the radial slots thereof, it will, of course, accelerate the movement of the turret, bringing it to its maximum when it has turned through an arc of approximately sixty degrees, and then will decelerate it until the roller leaves the radial groove, and the movement of the driving wheel is completed. In addition to this, however, there is a further quick or increased acceleration given to the turret by the movement of the roller toward the center of rotation of the arm during the first part of the movement of the turret and the slower movement or the additional deceleration accomplished by the outward movement of this roller and from the center of rotation of the arm. These particular movements given to the turret have the advantage that when the filled can with the cover loosely applied is fed into the pocket in the turret, it is moving, and the turret changes the direction of its movement, and therefore, the turret may move quickly during this part of its movement without resulting in the spilling of the contents of the can. When the turret is reaching the final end of its movement and a can is placed beneath the seaming station, it is brought to a stop, and the decelerated movement of the turret will gradually stop the movement of the can and thus also prevent spilling. Not only is there a decided advantage in the differential speed which is given to the turret through this operating mechanism, but there is a further advantage accomplished thereby in that the turret may be moved through an arc of one hundred and twenty degrees from one stopping position to the next stopping position. It would be impracticable to place the slots this extended arc distance apart if the roller was not moved away from the center of the driving wheel.

This means described in detail for imparting intermittent rotation to the turret may be used wherever it is desired to impart an intermittent movement to a member, and the mechanism described is, therefore, shown, described and claimed per se, in a companion application filed by Otto A. Schmitt, November 24, 1933, Serial No. 699,601.

Figure 2:
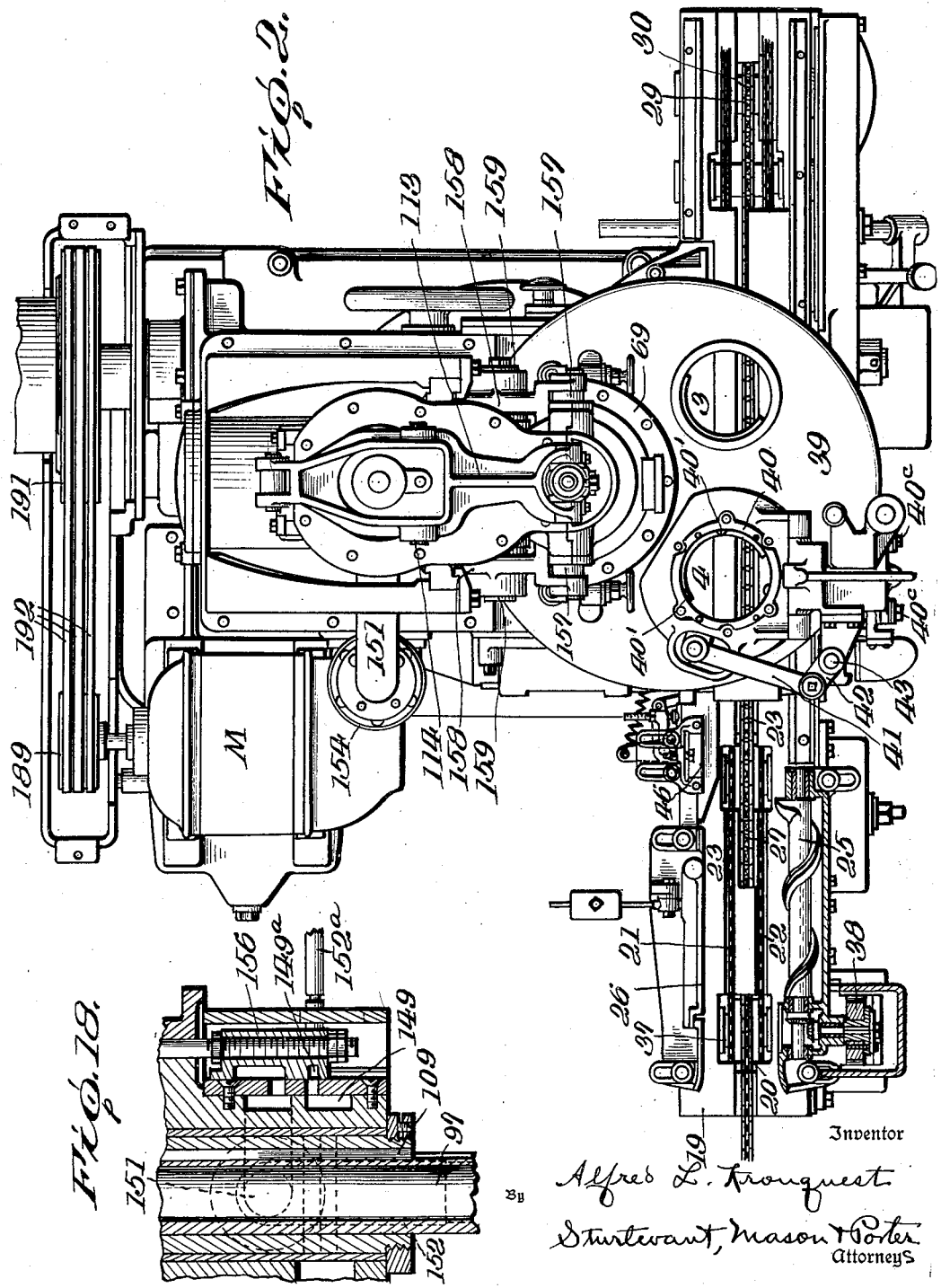
Fig. 2 is a plan view of the machine.

The driving mechanism for operating the seaming head and the parts associated therewith, also the turret and the parts associated therewith, will now be described. In Fig. 2 of the drawings there is shown a motor M which is mounted on the base of the machine. The motor shaft is provided with a belt wheel 189. Mounted in suitable bearings in the machine is a main actuating shaft 190. Mounted for free rotation about the axis of this shaft 190 is a belt wheel 191. A series of belts 192 run over the belt wheels 189 and 191, and thus the motor imparts rotation to this belt wheel 191. Mounted at the side of the belt wheel 191 is a disk 193 which is connected to the shaft 190. Said disk is adapted to be moved laterally into frictional engagement with the side face of the central web 194 of the actuating belt wheel 191. The actuating shaft 190 is in the form of a sleeve, and this sleeve shaft extends from the rear substantially to the front of the machine. The sleeve shaft is provided with an enlargement 195 with which is associated a ball bearing 196. There is also a ball bearing 197 supporting the other end of the sleeve shaft. Keyed to the sleeve shaft intermediate its ends is a spiral gear 198 which meshes with the worm gear 105 that is attached to the driving sleeve 103. Through this spiral gear on the main actuating shaft, the driving sleeve 103 is actuated, and this driving sleeve operates the turret and also the cam which raises and lowers the can supporting disk. Also keyed to the actuating sleeve shaft 190 is a gear 199. This gear 199 transmits rotating movement to the gear 101, and through this gear 101 the central shaft 97 is rotated, and this rotates the seaming head and the control cams for the seaming rollers.

The eccentric 44 operating the cover feed is mounted on a shaft 200. This shaft 200 is connected through suitable gears with the actuating gear 199 on the main actuating sleeve shaft 190. A sprocket chain 201 runs over a suitable sprocket on the shaft 200, and also over a suitable sprocket on the shaft 30. Thus it is that the shaft 30 is driven, and this through the feed chain 23 operates the shaft 28 which is geared to the shaft 34 for operating the feeding-in chains, and the shaft 34 actuates the shaft 37 through the sprocket chain 36, and this drives the timing screw. The feeding-out chains are operated from the shaft 30.

The clutch is shifted for connecting the actuating sleeve shaft 190 to the actuating belt wheel 191 by means of a control rod 202 which extends centrally through the sleeve shaft. On the left-hand end of this sleeve shaft, as viewed in Fig. 12, there is a cam member 203 which cooperates with levers 204, 204. These levers are mounted to swing, respectively, about pivots 205. Between the lug 206 carried by said lever and the disk 193 are springs 207. These levers are carried by and movable with the disk 193. Attached to the pivot pin and movable with each lever is an abutment arm 208. These abutment arms extend into slots formed in the main actuating sleeve shaft. When the control rod is moved to the right, as viewed in Fig. 12, then the levers 204 will be moved away from each other. The abutment arm engaging the end of the slot is held from endwise movement, and therefore, the disk 193 will be yieldingly pressed into engagement with the belt wheel and will be driven thereby. The levers are positively moved and the purpose of the springs is to yieldingly force the disk into contact with the belt wheel. This control rod 202 extends all the way through the sleeve shaft and has a threaded engagement with a cap plate 209. Keyed to the inner end of the actuating sleeve shaft 190 is a brake disk 210. Said brake disk is capable of endwise movement on the shaft. The cap plate bears against this brake disk. Disposed between a shoulder on the brake disk and the cap plate is a ring 211 having an annular groove therein. A yoke member 212 is provided with pins which engage said annular groove. This yoke member is connected to the hand lever 212a. When this yoke member is actuated so as to move the brake disk to the right, as viewed in Fig. 21, it will move the control rod to the right, and this will close the clutch so as to connect the main actuating belt wheel to the main actuating sleeve shaft. Surrounding this brake disk 210 is a brake drum 213. There is a lining 214 on the brake disk which contacts with the brake drum. When the control rod is moved in the opposite direction, it will release the clutch, and cause the brake disk to contact with the brake drum which is fixed to the frame and held from rotation. This will stop the actuated parts of the machine.

Located within the actuating sleeve shaft and surrounding the control rod is a spring 215. This spring bears against an abutment at one end thereof and against a sleeve 216 at its other end. The sleeve surrounds the control rod. Extending through slots in the actuating sleeve shaft is a bar 217. This bar 217 also extends through an elongated slot 218 in the control rod. This bar 217 bears against the end of the spiral gear and normally forces the same to the right, as viewed in Fig. 12, until it is brought into contact with an abutment sleeve 219. When the actuating sleeve shaft is rotated, it rotates the spiral gear and holds it up against this abutment sleeve. While the parts are in this position, the control rod may be shifted endwise to close the clutch or to release the clutch and stop the machine. In case there is a jam caused by a can being caught by the turret in its rotation, so that the turret stops, then the worm gear 105 will stop, and a continued rotation of the actuating sleeve will cause the spiral gear 198 to move to the left, as viewed in Fig. 12, away from the abutment sleeve 219. This will cause the bar 217 to move to the left, bringing the bar into engagement with the end of the slot in the control bar, and it will shift the control bar so as to release the clutch. If the jam is released so that the turret can turn, then the spring 215 which is compressed will cause the bar 217 to move to the right, sliding the spiral gear along the shaft and releasing the control rod so that the operator can start the machine. This provides an automatic means whereby if there is a jam stopping the turret, the machine will be automatically stopped. It will, however, remain disconnected from the actuating mechanism until the operator again starts the machine.

It is thought that the operation of the machine will be obvious from the detail description which has been given above. The filled cans are brought to the closing machine by conveyors and delivered into the timing screw which times the cans and delivers the same one at a time to the feed chain that places the filled can in the turret pocket. The turret is stationary when the can enters the pocket. Before, however, the can is fully seated in the pocket, the movement of the turret begins, and it will move the can away from the feed dog, so that the feed dog may pass the can. The can as it is moved by the turret, is brought to the seaming station and centered beneath the seaming head. There is a cam-actuated seating rod which contacts with the can and forces it back in the pocket against the centering rib, which is so disposed that the can is directly beneath the chuck which is to hold the can during the seaming operation. At the receiving station, a can end or cover was released which dropped into the pocket on to the can. After the turret has brought the can to the seaming station, then the supporting disk for the can moves upward slightly so as to lock the turret in this set position. The bell moves down contacting with the turret, and will force the turret down into contact with the shoe at the peripheral edge of the turret, and the can support beneath the turret, thus completely closing and sealing the pocket in the turret and forming a closed chamber which may be placed under vacuum. The valve controlling the ports leading to this chamber is then shifted so as to connect the chamber to a vacuum creating apparatus, and thus a vacuum is drawn on the chamber and on the can on which the cover loosely lies. If desired, the vacuumizing of the chamber may be followed by delivering inert gas thereto under pressure, and thus the container filled with an inert gas. The vacuumizing and gassing may be repeated, if desired. After the treatment of the can has been completed, then the can is lifted so as to bring the same into contact with the chuck, and the cover and the flange of the can body into range of the seaming rolls. The seaming rolls are then moved forward to bring about the seaming operations. The can cover is received by the seating pad and fully seated in the can prior to the chucking of the can. The seating pad serves as an ejector for stripping the can from the chuck at the completion of the seaming operation. The turret is given a movement through an arc of one hundred and twenty degrees as it conveys the can from the receiving station to the seaming station. This one hundred and twenty degree movement of the turret is accomplished by a sixty degree movement of the operating arm 180. The arm 180 makes one rotation for each complete can closing cycle, and therefore, there is an arc movement of three hundred degrees left for closing the pocket, vacuumizing the can, sealing the same, and releasing the turret so that it may be again moved to carry the can to the delivering station. Only approximately forty-five degrees of this three hundred degree movement of the arm 180 is required to perform the seaming operation, and this leaves a very long period while the arm 180 is moving through the arc of two hundred and fifty-five degrees for vacuumizing and gassing the can.

Having thus described the invention, what I claim as new and desire to secure by Letters Patent, is—

1. A closing machine for cans comprising a seaming mechanism, a bell housing said seaming mechanism, a turret having can pockets, a support beneath said turret on which the cans are moved to and from the seaming station, means for placing the can to be closed in the pocket of the turret, means for intermittently rotating said turret for placing the pockets thereof in succession beneath said bell and the cans beneath the seaming mechanism, means for yieldingly raising and holding said turret out of contact with said support during the rotation thereof, and means for moving said bell into engagement with the turret and the turret into engagement with the support for forming a sealed chamber enclosing the can.

2. A closing machine for cans comprising a seaming mechanism, a bell housing said seaming mechanism, a turret having can pockets opening at the periphery thereof, a can support beneath said turret, means for intermittently rotating said turret for placing the pockets thereof in succession beneath the bell, a shoe for closing the pocket beneath the bell, means for yieldingly raising said turret out of contact with said support and shoe, and means for moving the bell into engagement with the turret and the turret into engagement with the support and shoe for forming a sealed chamber enclosing the can.

3. A closing machine for cans comprising a seaming mechanism, a bell housing said seaming mechanism, a turret having can pockets opening at the periphery thereof, a can support beneath said turret, means for intermittently rotating said turret for placing the pockets thereof in succession beneath the bell, a shoe for closing the pocket beneath the bell, said turret having a tapered peripheral face with the maximum diameter adjacent the upper end and said shoe being similarly tapered, means for yieldingly raising the turret out of contact with the support and shoe, and means for moving said bell into engagement with the turret and the turret into engagement with the support and shoe for forming a sealed chamber enclosing the can.

4. A closing machine for cans comprising a seaming mechanism, a bell housing said seaming mechanism, a turret having can pockets, a support beneath said turret on which the cans are moved to and from the seaming station, means for placing the can to be closed in the pocket of the turret, means for intermittently rotating said turret for placing the pockets thereof in succcession beneath said bell and the cans beneath the seaming mechanism, means for yieldingly raising and holding said turret out of contact with said support during the rotation thereof, means for moving said bell into engagement with the turret and the turret into engagement with the support for forming a sealed chamber enclosing the can, and means whereby said chamber may be placed under vacuum prior to the sealing of the can and opened to the atmosphere after said can has been sealed.

5. A closing machine for cans comprising a seaming mechanism, including a chuck, a bell housing said seaming mechanism, a turret having can pockets open at the periphery thereof movable beneath said bell, a can support beneath said turret, means for intermittently rotating said turret for placing the pockets thereof in succcession beneath said bell, a shoe for closing the pocket beneath the bell, a can supporting disk shaped to enter said pocket and hold the turret from movement, and means for raising said can supporting disk into the pocket and for lifting the can into engagement with the chuck.

6. A closing machine for cans comprising a seaming mechanism, including a chuck, a bell housing said seaming mechanism, a turret having can pockets open at the periphery thereof movable beneath said bell, a can support beneath said turret, means for intermittently rotating said turret for placing the pockets thereof in succcession beneath said bell, a shoe for closing the pocket beneath the bell, a can supporting disk shaped to enter said pocket and hold the turret from movement, means for raising said can supporting disk into the pocket and for lifting the can into engagement with the chuck, means for yieldingly raising said turret out of contact with said support and shoe, and means for moving the bell into engagement with the turret and the turret into engagement with the support for forming a sealed chamber enclosing the can.

7. A closing machine for cans comprising a seaming mechanism, a bell housing said seaming mechanism, a turret having can pockets therein, a can support beneath the turret, each pocket from the bottom of the turret to a point adjacent the top opening at the periphery of the turret and above said peripheral opening being cylindrical and opening at the upper face of the turret, said pocket having therein a centering rib for centering the can beneath said circular opening, the outer face of said turret to the height of said peripheral opening being tapered upwardly and outwardly, and a shoe for closing the pocket beneath the bell, said shoe having a similarly tapered face adapted to be engaged by the tapered face on the turret.

8. A closing machine for cans comprising a seaming mechanism, a bell housing said seaming mechanism, a turret having can pockets therein, a can support beneath the turret, each pocket from the bottom of the turret to a point adjacent the top opening at the periphery of the turret and above said peripheral opening being cylindrical and opening at the upper face of the turret, said pocket having therein a centering rib for centering the can beneath said circular opening, the outer face of said turret to the height of said peripheral opening being tapered upwardly and outwardly, a shoe for closing the pocket beneath the bell, said shoe having a similarly tapered face adapted to be engaged by the tapered face on the turret, means for yieldingly raising said turret out of contact with said support and shoe, and means for moving said bell into engagement with the turret and the turret into engagement with the support and shoe for forming a sealed chamber and closing the can.

9. A closing machine for cans comprising a seaming mechanism including a rotating seaming head, a stationary chuck, a bell housing the seaming mechanism and mounted for vertical reciprocation on the seaming head, means for sealing the movable connections of the seaming head extending from said bell, a turret having can pockets at the periphery thereof movable beneath said bell, said pocket above the peripheral opening being cylindrical and opening at the outer face of said turret, said bell having a gasket adapted to engage the face of the turret all the way around said opening, a shoe beneath said bell for closing the peripheral opening of the pocket, said peripheral face of the turret and said shoe being similarly tapered outwardly and upwardly, a can support beneath said turret for closing the lower end of said pocket, a gasket at the lower face of said turret extending around the pocket and terminating at the periphery thereof, means for yieldingly raising said turret out of contact with the can support and the shoe, and means for moving the bell into engagement with the turret and the turret into engagement with the support and shoe for forming a sealed chamber and closing the can.

10. A closing machine for cans comprising a seaming mechanism including a rotating seaming head, a stationary chuck, a bell housing the seaming mechanism and mounted for vertical reciprocation on the seaming head, means for sealing the movable connections of the seaming head extending from said bell, a turret having can pockets at the periphery thereof movable beneath said bell, said pocket above the peripheral opening being cylindrical and opening at the outer face of said turret, said bell having a gasket adapted to engage the face of the turret all the way around said opening, a shoe beneath said bell for closing the peripheral opening of the pocket, said peripheral face of the turret and said shoe being similarly tapered outwardly and upwardly, a can support beneath said turret for closing the lower end of said pocket, a gasket at the lower face of said turret extending around the pocket and terminating at the periphery thereof, means for yieldingly raising said turret out of contact with the can support and the shoe, means for moving the bell into engagement with the turret and the turret into engagement with the support and shoe for forming a sealed chamber and closing the can, and means for placing said chamber under vacuum prior to the closing of the can and for releasing said chamber to the atmosphere after the can is closed.

11. A closing machine for cans comprising a seaming station, a receiving station and a delivering station, intermittently rotating turrets having pockets for receiving cans, delivering the same to the seaming station and to the delivering station after the can is closed, a feed chain having feed dogs thereon for conveying a can into one of said pockets at the receiving station and for removing a closed can from a pocket at the delivering station, and means for intermittently rotating said turret, said means including devices for accelerating the intermittent movement imparted to the turret at the receiving station and decelerating the intermittent movement of the turret as it approaches the seaming station.

12. A closing machine for cans comprising a seaming station, a receiving station and a delivering station, intermittently rotating turrets having pockets for receiving cans, delivering the same to the seaming station and to the delivering station after the can is closed, a feed chain having feed dogs thereon for conveying a can into one of said pockets at the receiving station and for removing a closed can from a pocket at the delivering station, means for intermittently moving the turret including a driving wheel having radial grooves therein, a rotating arm, laterally projecting members pivoted to the outer end of said arm, a roller carried by said members and adapted to move into and out of a radial groove for imparting an intermittent movement to said driving wheel, and a control cam operating to shift said pivoted members so as to accelerate the first part of the intermittent movement and decelerate the latter part thereof.

13. A closing machine for cans comprising a seaming station, a receiving station and a delivering station, intermittently rotating turrets having pockets for receiving cans, delivering the same to the seaming station and to the delivering station after the can is closed, a feed chain having feed dogs thereon for conveying a can into one of said pockets at the receiving station and for removing a closed can from a pocket at the delivering station, means for intermittently rotating said turret, said intermittent means including an actuated shaft, driving means for said actuated shaft including a clutch, and means whereby said clutch is automatically opened for stopping the machine in case of a jam which stops the movement of said turret.

14. A closing machine for cans comprising a seaming station, a receiving station and a delivering station, intermittently rotating turrets having pockets for receiving cans, delivering the same to the seaming station and to the delivering station after the can is closed, a feed chain having feed dogs thereon for conveying a can into one of said pockets at the receiving station and for removing a closed can from a pocket at the delivering station, means for intermittently rotating said turret, said intermittent means including an actuated shaft, a worm gear carried thereby, a spiral gear meshing with said worm gear for driving the same, a shaft on which said spiral gear is splined, an abutment sleeve surrounding the shaft at one end of said spiral gear, a spring moving with the shaft and contacting with the spiral gear for moving the same into contact with said abutment sleeve, said abutment sleeve and spring being disposed so that when the turret stops in case of a jam, thus stopping the worm gear, the spiral gear will move endwise on said shaft, a clutch for connecting said shaft to the driving means, and means operated by the shifting movement of said spiral gear on said shaft for opening the clutch and stopping the machine.

15. A closing machine for cans comprising a seaming mechanism, a conveying mechanism for conveying cans to and from the seaming mechanism, actuating devices for said conveying mechanism including an actuated shaft, a worm gear carried thereby, a spiral gear meshing with said worm gear, an actuating shaft to which said spiral gear is splined for endwise movement, an abutment sleeve for limiting the movement of said spiral gear on said shaft, a spring bearing against said spiral gear for normally holding the same against said abutment sleeve, said spring and abutment sleeve being positioned so that in case of a jam stopping the conveying mechanism, the spiral gear rotating on the stopped worm gear will move endwise on said actuating shaft, and means controlled by the endwise movement of the spiral gear on said shaft for opening said clutch for stopping the machine.

ALFRED L. KRONQUEST.